United States Patent
Lin et al.

(10) Patent No.: US 12,142,253 B2
(45) Date of Patent: Nov. 12, 2024

(54) SOLID ADHESIVE FILM FOR ACOUSTIC LINER AND METHOD

(71) Applicant: General Electric Company, Schenectady, NY (US)

(72) Inventors: Wendy Wenling Lin, Montgomery, OH (US); David Herman, Beavercreek, OH (US)

(73) Assignee: General Electric Company, Evendale, OH (US)

( * ) Notice: Subject to any disclaimer, the term of this patent is extended or adjusted under 35 U.S.C. 154(b) by 304 days.

(21) Appl. No.: 17/449,980

(22) Filed: Oct. 5, 2021

(65) Prior Publication Data
US 2023/0103556 A1    Apr. 6, 2023

(51) Int. Cl.
*G10K 11/168*    (2006.01)
*B32B 3/12*    (2006.01)
(Continued)

(52) U.S. Cl.
CPC .............. *G10K 11/168* (2013.01); *B32B 3/12* (2013.01); *B32B 5/028* (2013.01); *B32B 7/12* (2013.01); *B32B 37/1284* (2013.01); *B32B 38/04* (2013.01); *B32B 41/00* (2013.01); *C09J 7/38* (2018.01); *B32B 2038/047* (2013.01);
(Continued)

(58) Field of Classification Search
CPC . G10K 11/168; C09J 7/38; B32B 3/12; B32B 7/12; B32B 5/028; B32B 37/1284; B32B 38/04; B32B 41/00; B32B 2038/047; B32B 2307/102; B32B 2310/0843; B32B 2605/18; F02K 1/827; F05D 2220/323
See application file for complete search history.

(56) References Cited

U.S. PATENT DOCUMENTS 3,035,657 A    5/1962    Lemon
3,070,198 A    12/1962    Haskell
(Continued)

FOREIGN PATENT DOCUMENTS

EP    0405581 B1    10/1993
EP    0698159 A1    2/1996
(Continued)

OTHER PUBLICATIONS

Bertolucci, An Experimental Investigation of the Grazing Flow Impedance Duct at the University of Florida for Acoustic Liner Applications, University of Florida Dissertation, 2012, 217 Pages.
(Continued)

*Primary Examiner* — Forrest M Phillips
(74) *Attorney, Agent, or Firm* — McGarry Bair PC

(57) ABSTRACT

A system and method for bonding together a facesheet and an acoustic screen of an acoustic liner using a solid adhesive film having a first adhesive side opposite a second adhesive side are provided. The system includes a solid adhesive film having a first adhesive side opposite a second adhesive side; an acoustic screen bonded to the first adhesive side of the solid adhesive film; and a facesheet bonded to the second adhesive side of the solid adhesive film. The method includes bonding the facesheet to the first adhesive side of the solid adhesive film and bonding the acoustic screen to the second adhesive side of the solid adhesive film.

20 Claims, 15 Drawing Sheets

(51) Int. Cl.
  *B32B 5/02* (2006.01)
  *B32B 7/12* (2006.01)
  *B32B 37/12* (2006.01)
  *B32B 38/04* (2006.01)
  *B32B 41/00* (2006.01)
  *C09J 7/38* (2018.01)
  *F02K 1/82* (2006.01)

(52) U.S. Cl.
  CPC . *B32B 2307/102* (2013.01); *B32B 2310/0843* (2013.01); *B32B 2605/18* (2013.01); *F02K 1/827* (2013.01); *F05D 2220/323* (2013.01)

(56) References Cited

U.S. PATENT DOCUMENTS

| | | |
|---|---|---|
| 3,232,371 A | 2/1966 | Reichert |
| 3,734,234 A | 5/1973 | Wirt |
| 3,803,754 A | 4/1974 | Fischer |
| 3,819,009 A | 6/1974 | Mot |
| 3,831,710 A | 8/1974 | Wirt |
| 3,850,261 A | 11/1974 | Hehmann et al. |
| 3,887,031 A | 6/1975 | Wirt |
| 3,905,443 A | 9/1975 | Sieuzac |
| 3,913,702 A | 10/1975 | Wirt et al. |
| 4,001,473 A | 1/1977 | Cook |
| 4,035,535 A | 7/1977 | Taylor |
| 4,074,496 A | 2/1978 | Fischer |
| 4,141,433 A | 2/1979 | Warnaka |
| 4,243,117 A | 1/1981 | Warnaka |
| 4,265,955 A | 5/1981 | Harp et al. |
| 4,291,080 A | 9/1981 | Ely et al. |
| 4,298,090 A | 11/1981 | Chapman |
| 4,339,018 A | 7/1982 | Warnaka |
| 4,551,110 A | 11/1985 | Selvage et al. |
| 4,676,762 A | 6/1987 | Ballard |
| 4,746,389 A | 5/1988 | DiGenova |
| 5,175,401 A | 12/1992 | Arcas et al. |
| 5,353,502 A | 10/1994 | Hattori et al. |
| 5,445,861 A | 8/1995 | Newton et al. |
| 5,480,729 A | 1/1996 | Hattori et al. |
| 5,690,035 A | 11/1997 | Hatayama et al. |
| 5,760,349 A | 6/1998 | Borchers et al. |
| 5,959,264 A | 9/1999 | Brück et al. |
| 6,176,964 B1 | 1/2001 | Parente et al. |
| 6,182,787 B1 | 2/2001 | Kraft et al. |
| 6,200,664 B1 | 3/2001 | Figge et al. |
| 6,203,656 B1 | 3/2001 | Syed |
| 6,206,136 B1 | 3/2001 | Swindlehurst et al. |
| 6,209,679 B1 | 4/2001 | Hogeboom et al. |
| 6,256,959 B1 | 7/2001 | Palmersten |
| 6,630,093 B1 | 10/2003 | Jones |
| 6,772,857 B2 | 8/2004 | Porte et al. |
| 6,827,180 B2 | 12/2004 | Wilson |
| 6,840,349 B2 | 1/2005 | Andre et al. |
| 6,871,725 B2 | 3/2005 | Johnson |
| 6,884,486 B2 | 4/2005 | Estrin et al. |
| 6,913,570 B2 | 7/2005 | Kehrle |
| 7,296,656 B2 | 11/2007 | Sanicki et al. |
| 7,410,455 B2 | 8/2008 | Akishev et al. |
| 7,484,592 B2 | 2/2009 | Porte et al. |
| 7,510,052 B2 | 3/2009 | Ayle |
| 7,819,224 B2 | 10/2010 | Borchers et al. |
| 7,866,377 B2 | 1/2011 | Slaughter |
| 7,906,205 B2 | 3/2011 | Meres |
| 7,921,966 B2 | 4/2011 | Chiou et al. |
| 7,935,205 B2 | 5/2011 | Bogue et al. |
| 7,954,224 B2 | 6/2011 | Douglas |
| 7,963,362 B2 | 6/2011 | Lidoine |
| 7,967,108 B2 | 6/2011 | Harper |
| 7,971,684 B2 | 7/2011 | Gantie et al. |
| 7,981,519 B2 | 7/2011 | Holland et al. |
| 8,016,230 B2 | 9/2011 | Fogarty et al. |
| 8,047,326 B2 | 11/2011 | Valleroy et al. |
| 8,464,831 B2 | 6/2013 | Olander Burak et al. |
| 8,579,076 B2 | 11/2013 | Ayle et al. |
| 8,689,936 B2 | 4/2014 | Richter |
| 8,784,592 B2 | 7/2014 | Kolax et al. |
| 8,789,652 B2 | 7/2014 | Swallowe et al. |
| 8,905,189 B2 | 12/2014 | Ayle et al. |
| 8,985,513 B2 | 3/2015 | Dean et al. |
| 8,997,923 B2 | 4/2015 | Ichihashi |
| 9,175,474 B2 | 11/2015 | May et al. |
| 9,222,229 B1 | 12/2015 | Chang et al. |
| 9,284,726 B2 | 3/2016 | Tien |
| 9,290,274 B2 | 3/2016 | Roach et al. |
| 9,296,044 B2 | 3/2016 | Douglas |
| 9,302,869 B2 | 4/2016 | Kendrick et al. |
| 9,365,022 B2 | 6/2016 | Kendrick et al. |
| 9,378,721 B2 | 6/2016 | Zalewski et al. |
| 9,514,734 B1 | 12/2016 | Jones et al. |
| 9,546,602 B2 | 1/2017 | Julliard et al. |
| 9,607,600 B2 | 3/2017 | Swallowe et al. |
| 9,693,166 B2 | 6/2017 | Herrera et al. |
| 9,759,447 B1 | 9/2017 | Mathur |
| 9,909,471 B2 | 3/2018 | Mattia |
| 9,978,354 B2 | 5/2018 | Nampy |
| 10,032,445 B1 | 7/2018 | Linch et al. |
| 10,107,139 B1 | 10/2018 | Jones et al. |
| 10,174,675 B2 | 1/2019 | Martinez et al. |
| 10,294,815 B2 | 5/2019 | Runyan et al. |
| 10,332,501 B2 | 6/2019 | Lin et al. |
| 10,414,481 B2 | 9/2019 | Pierick et al. |
| 10,823,059 B2 | 11/2020 | Herman et al. |
| 11,047,304 B2 | 6/2021 | Lin et al. |
| 11,059,559 B2 | 7/2021 | Cedar et al. |
| 11,485,107 B1 * | 11/2022 | Parker ................ B32B 37/1207 |
| 2001/0048027 A1 | 12/2001 | Walsh |
| 2004/0048027 A1 | 3/2004 | Hayes et al. |
| 2010/0307867 A1 | 12/2010 | Ogawa et al. |
| 2011/0100749 A1 | 5/2011 | Nonogi et al. |
| 2011/0244213 A1 | 10/2011 | Jones |
| 2012/0006028 A1 | 1/2012 | Lee et al. |
| 2013/0306402 A1 | 11/2013 | Todorovic |
| 2014/0133964 A1 | 5/2014 | Ayle |
| 2014/0251481 A1 | 9/2014 | Kroll et al. |
| 2014/0305529 A1 | 10/2014 | Kroll et al. |
| 2014/0341744 A1 | 11/2014 | Cazuc et al. |
| 2015/0027629 A1 | 1/2015 | Butler et al. |
| 2015/0044413 A1 | 2/2015 | Vauchel et al. |
| 2015/0064015 A1 | 3/2015 | Perez |
| 2015/0090526 A1 * | 4/2015 | Sasaki ................ G10K 11/16 |
| | | 181/294 |
| 2015/0110603 A1 | 4/2015 | Biset et al. |
| 2015/0292413 A1 | 10/2015 | Soria et al. |
| 2015/0373470 A1 * | 12/2015 | Herrera ............... B32B 37/0046 |
| | | 156/196 |
| 2016/0010863 A1 | 1/2016 | Ott et al. |
| 2016/0017775 A1 | 1/2016 | Mattia |
| 2016/0017810 A1 | 1/2016 | Lord et al. |
| 2016/0067938 A1 | 3/2016 | Goodrich |
| 2016/0109130 A1 | 4/2016 | Stastny et al. |
| 2016/0123160 A1 | 5/2016 | Strock et al. |
| 2016/0319690 A1 | 11/2016 | Lin et al. |
| 2016/0354712 A1 | 12/2016 | Lin et al. |
| 2017/0043550 A1 | 2/2017 | Coïc et al. |
| 2017/0045059 A1 | 2/2017 | Care et al. |
| 2017/0072638 A1 | 3/2017 | Hayes et al. |
| 2017/0191414 A1 | 7/2017 | Martinez et al. |
| 2018/0016987 A1 | 1/2018 | Howarth et al. |
| 2018/0162542 A1 | 6/2018 | VanDeMark et al. |
| 2018/0174568 A1 | 6/2018 | Porte et al. |
| 2018/0218723 A1 | 8/2018 | Lin et al. |
| 2018/0245516 A1 | 8/2018 | Howarth et al. |
| 2019/0080679 A1 | 3/2019 | Alstad |
| 2019/0272812 A1 | 9/2019 | Lin et al. |
| 2019/0301370 A1 * | 10/2019 | Joshi .................... E04B 1/82 |
| 2020/0291645 A1 * | 9/2020 | Scamardo ............. B32B 5/028 |
| 2020/0309028 A1 * | 10/2020 | Murugappan ........... F02K 1/827 |
| 2021/0190007 A1 * | 6/2021 | Lauder .................... F02C 7/24 |
| 2021/0193100 A1 * | 6/2021 | Froning ................... C09J 7/35 |

(56) References Cited

U.S. PATENT DOCUMENTS

2023/0290326 A1* 9/2023 Mok .................. G10K 11/168
                                                                181/290

FOREIGN PATENT DOCUMENTS

| EP | 0911803 | A2 | 4/1999 |
|---|---|---|---|
| EP | 0839101 | B1 | 1/2002 |
| EP | 1715172 | A2 | 10/2006 |
| EP | 2960023 | A1 | 12/2015 |
| EP | 3232434 | A1 | 10/2017 |
| JP | S58156052 | U | 10/1983 |
| JP | H0333897 | A | 2/1991 |
| WO | WO2016/0133501 | A1 | 8/2016 |

OTHER PUBLICATIONS

Bielak et al., Advanced Nacelle Acoustic Lining Concepts Development, NASA, CR-2002-211672, Aug. 2002, Total pp. 203.
Dai et al., Acoustic of a Perforated Liner with Grazing Flow: Floquet-Bloch Periodical Approach Versus Impedance Continuous Approach, Research Gate, The Journal of the Acoustical Society of America, Sep. 2016, 10 Pages. http://dx.doi.org/10.1121/1.4962490.
Dannemann et al., Experimental Study of Advanced Helmholtz Resonator Liners with Increased Acoustic Performance by Utilising Material Damping Effects, Applied Sciences, 2018, 18 Pages.
Jones et al., Evaluation of Parallel-Element, Variable-Impedance, Broadband Acoustic Liner Concepts, AIAA-2012-2194, Jun. 2012, 17 Pages.
Kraft et al., Acoustic Treatment Design Scaling Methods, vol. 2: Advanced Treatment Impedance Models for High Frequency Ranges, NASA, CR-1999-209120, vol. 2, 1999, Total pp. 98.
Lawn, Acoustic Pressure Losses in Woven Screen Regenerators, ResearchGate, Applied Acoustics, vol. 77, Mar. 2014, pp. 42-48.
Malmary et al., Acoustic Impedance Measurement with Grazing Flow, AIAA-2001-2193, $7^{th}$ AIAA/CEAS Aeroacoustics Conference, May 2001, Netherlands, 9 Pages.
Martinson, Mechanical Design for 3D Printing, Nov. 2012, 15 pages. http://eikimartinson.com/engineering/3dparts/#dovetail.

Motsinger et al., Design and Performance of Duct Acoustic Treatment, NASA, N92-14783, 1991, pp. 165-206. https://ntrs.nasa.gov/archive/nasa/casi.ntrs.nasa.gov/19920005565.pdf.
Nark et al., Acoustic Liner Overview, Acoustics Technical Working Group Meeting, NASA Langley Research Center, Cleveland, Oct. 22-23, 2019, pp. 1-25.
Primus et al., ONERA-NASA Cooperative Effort on Liner Impedance Education, AIAA 2013-2273, Research Gate, $19^{th}$ AIAA/CEAS Aeroacoustics Conference, May 2013, Germany, 16 Pages.
Schiller et al., Experimental Evaluation of Acoustic Engine Liner Models Developed with COMSOL Multiphysics, $23^{rd}$ American Institute of Aeronautics and Astronautics, DEAS Aeroacoustics Conference, NASA, 2017, 25 Pages. https://ntrs.nasa.gov/archive/nasa/casi.ntrs.nasa.gov/20170005768.pdf.
Sellen et al., Noise Reduction in a Flow Duct: Implementation of a Hybrid Passive/Active Solution, Science Direct, Journal of Sound and Vibration, vol. 297, 2006, pp. 492-511.
Soderman et al., Design and Development of a Deep Acoustic Lining for the 40-by 80 Foot Wind Tunnel Test Station, NASA TP-2002-211850, Nov. 2002, 61 Pages.
Syed et al., Paper No. 07ATC-43 Development of the Acousti-Cap TM Technology Double-Layer Acoustic Liners in Aircraft Engine Nacelles, Research Gate, 2007 SAE International, 23 Pages.
Tam et al., Experimental Validation of Numerical Simulations for An Acoustic Liner in Grazing Flow, 30 Pages. https://ntrs.nasa.gov/archive/nasa/casi-ntrs.nasa.gov/20130014086.pdf.
Tam et al., Numerical Simulation of a Slit Resonator in a Grazing Flow, AIAA 2006-799, $44^{th}$ AIAA Aerospace Meeting and Exhibit, Nevada, 2006, 20 Pages.
Zhang, Numerical Simulation of Two-Dimensional Acoustic Liners with High Speed Grazing Flow, MS Thesis, Urbana, Illinois, 2010, 90 Pages.
Zhou, Acoustic Characterization of Orifices and Perforated Liners with Flow and High-Level Acoustic Excitation, DiVA Digitala Vetenskapliga Arkivet, KTH Royal Institute of Technology School of Engineering Sciences (SCI), Aeronautical and Vehicle Engineering, MWL Flow Acoustics, Doctoral Thesis, Stockholm, p. vi, 2015, 70 Pages. http://www.diva-portal.org/smash/record.jsf?pid=diva2:813073.

* cited by examiner

SOLID ADHESIVE FILM FOR ACOUSTIC LINER AND METHOD

FEDERALLY SPONSORED RESEARCH

This disclosure was made with government support under contract number DTFAWA-15-A-80013 awarded by the United States Department of Transportation Federal Aviation Administration (FAA). The government has certain rights in the disclosure.

FIELD

The present subject matter relates generally to acoustic liners including an acoustic screen and a facesheet and methods for bonding the acoustic screen and the facesheet.

BACKGROUND

Acoustic liners may be used to dampen or attenuate sound waves. For example, acoustic liners are used to dampen or attenuate noise from turbomachines such as turbofan engines as well as noise from other devices such as wind turbine blades.

Exemplary acoustic liners include an acoustic core positioned between a perforated or otherwise porous acoustic screen and a substantially imperforate back sheet. The acoustic core may include a plurality of resonant cells. The perforated or otherwise porous acoustic screen allows sound waves to enter the acoustic core and emanate in such a way as to dampen or attenuate sound waves.

The acoustic screen is attached to a facesheet. Conventional methods of attaching these components include liquid film and spray adhesives. However, these adhesives can liquify and wick into the acoustic screen when heated for cure thereby becoming a debris that blocks apertures formed in the acoustic screen and the facesheet, impacting airflow through the apertures. Further, liquid spray adhesives provide lower levels of adhesion between the acoustic screen and the facesheet.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1A:
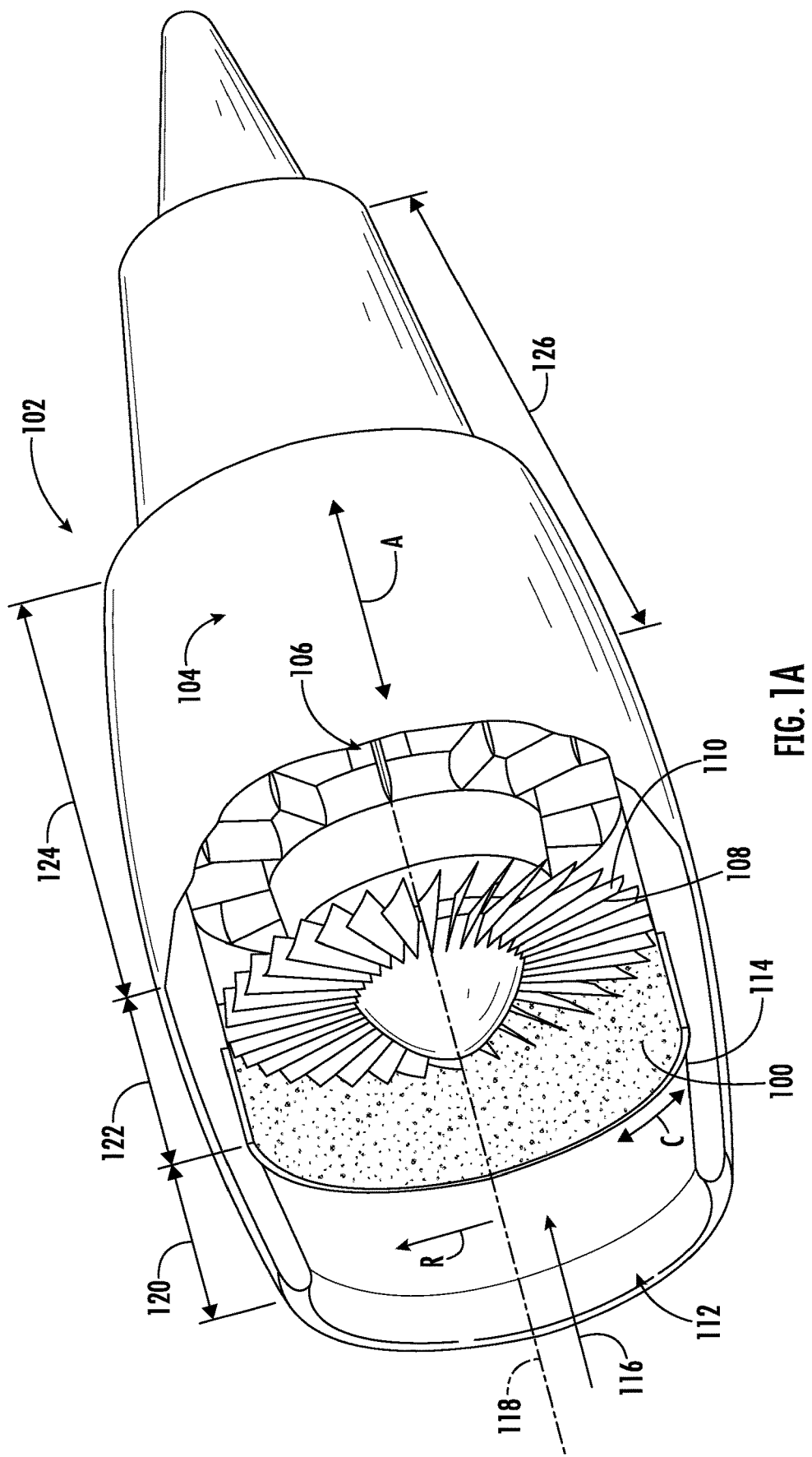
FIG. 1A schematically depicts a perspective partial cutaway view of an exemplary turbomachine that has an acoustic liner in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Advanced acoustic liners in general require low resistance facesheets, having a high percentage of open area, wherein an acoustic screen is bonded to the facesheet.

As described above, conventional methods of attaching these components include liquid film and spray adhesives. However, these adhesives can liquify and wick into the acoustic screen when heated for cure thereby becoming a debris that blocks a plurality of apertures formed in the acoustic screen and facesheet, impacting airflow through the apertures. Further, liquid spray adhesives provide lower levels of adhesion between the acoustic screen and the facesheet. These challenges of conventional methods with aperture blockage caused by adhesive liquid flow are solved with the systems and methods of the present disclosure using a solid adhesive film. Furthermore, systems and methods of the present disclosure ensure alignment of the solid adhesive film and the facesheet, e.g., alignment of perforations of the components, during the bonding process. The solid adhesive film of the present disclosure allows for bonding of an acoustic screen to a perforated facesheet in an acoustic liner.

Figure 1B:
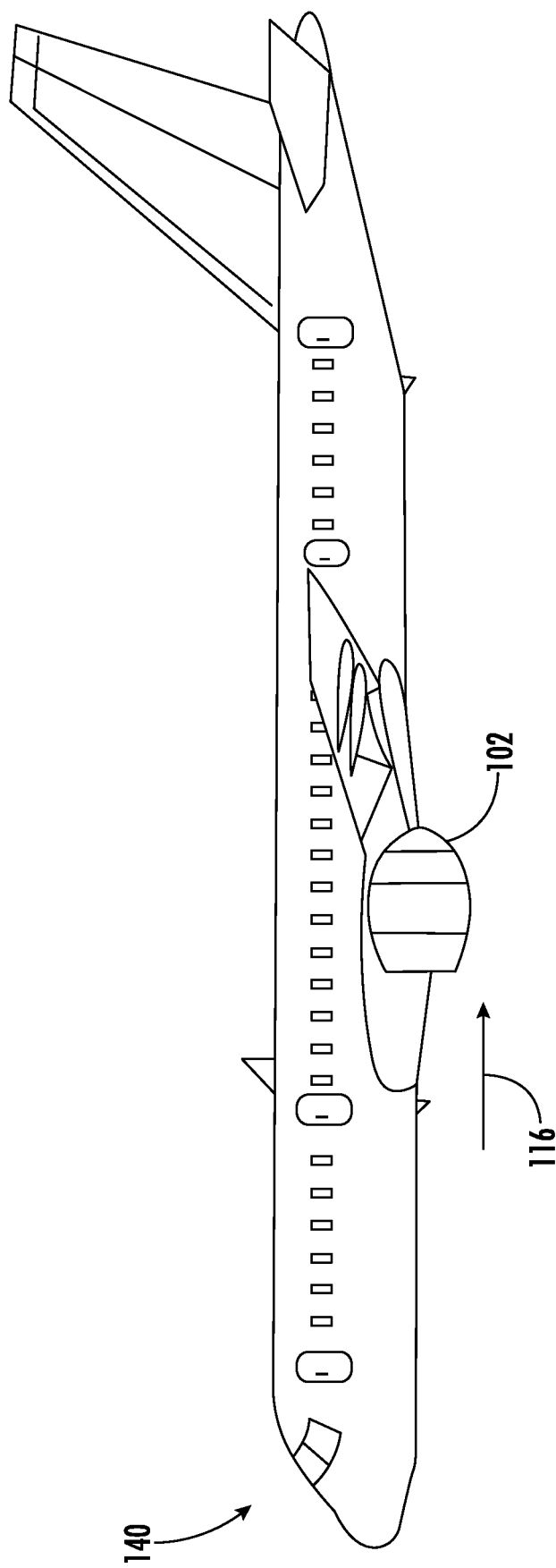
FIG. 1B schematically depicts an aircraft equipped with a turbomachine that has an acoustic liner in accordance with an exemplary embodiment of the present disclosure.

Exemplary embodiments of the present disclosure will now be described in further detail. As shown in FIG. 1A, one or more acoustic liners 100 may provide a system for damping or attenuating sound waves, including sound waves associated with a turbomachine 102. In an exemplary embodiment shown in FIG. 1B, an aircraft 140 may include a turbomachine 102 (e.g., a turbofan engine) with one or more acoustic liners 100 configured to attenuate noise from the turbomachine 102. In other exemplary embodiments, it is contemplated that a wind turbine may include turbine blades with one or more acoustic liners 100 applied to one or more portions of the turbine blades to attenuate noise therefrom. As shown in FIG. 1A, the turbomachine 102 defines an axial direction A (extending parallel to a longitudinal axial centerline 118 provided for reference), a radial direction R, and a circumferential direction C (extending about the axial direction A).

Still referring to FIG. 1A, the turbomachine 102 may include a housing or nacelle 104 surrounding a turbine 106 and/or a fan rotor 108, which includes a plurality of circumferentially spaced fan blades 110 powered by the turbine 106. The exemplary housing or nacelle 104 includes an inlet 112 and a duct having a duct wall 114 that directs airflow 116 downstream through the fan rotor 108, generally along the longitudinal axial centerline 118. The one or more acoustic liners 100 provide a system for damping or attenuating sound waves. An exemplary system may include one or more acoustic liners 100 disposed annularly along the duct wall 114. The one or more acoustic liners 100 may have a position along the duct wall 114 located upstream from the fan blades 110. One or more acoustic liners 100 may also be positioned downstream from the fan blades 110. For example, one or more acoustic liners 100 may be positioned at or aft of an inner barrel 120 portion of the nacelle 104. Additionally, or alternatively, one or more acoustic liners 100 may be positioned at or aft of a fan casing portion 122 and/or a transcowl portion 124 of the nacelle 104. In some embodiments, a turbomachine 102 may include a plurality of housings 104 surrounding the turbine 106. In some embodiments, a plurality of housings 104 may be configured and arranged annularly relative to one another. Each such housing 104 may include an inner duct wall and an outer duct wall. One or more acoustic liners 100 may be positioned about the inner duct wall and/or the outer duct wall of any one or more of the plurality of housings 104. Additionally, one or more acoustic liners 100 may be positioned in proximity to non-rotating portions of the fan casing portion 122 or other components of the turbomachine 102. These positions include ducts or casings within the turbomachine 102 where one or more acoustic liners 100 may be useful for noise suppression (e.g., damping or attenuation) at various frequency ranges, including across a spectrum of frequency ranges. For example, one or more acoustic liners 100 may be positioned at a core cowl portion 126. Those skilled in the art will appreciate even further areas where one or more acoustic liners 100 may be positioned to dampen or attenuate noise generated by or emanating from various aspects of a turbomachine 102, all of which are within the scope of the present disclosure.

In operation, the turbomachine 102 generates an excessive amount of noise. To illustrate an exemplary source of turbomachine noise, it will be appreciated that the fan rotor 108 rotates within the fan casing portion 122, producing discrete tonal noise predominately at a blade passage frequency (BPF) and multiples thereof, as well as broadband noise over a wide frequency range. During take-off of the aircraft 140, the fan blades 110 can reach transonic and supersonic rotational velocities, generating noise that propagates out of the duct defined by the duct wall 114 into the surrounding environment. In exemplary embodiments, the one or more acoustic liners 100 are configured and arranged to suppress noise resonating at the BPF and harmonics of the BPF as well as the dominant broadband noise contributions from the fan. The one or more acoustic liners 100 or various portions thereof may be configured to dampen or attenuate sound waves and thereby reduce the sound at specific frequencies or across a range of frequencies. Some aspects of the one or more acoustic liners 100 may be configured to reflect or propagate incident sound waves multiple times before the sound waves escape the one or more acoustic liners 100. These multiple reflections may reduce the amplitude of the sound waves. Additionally, some aspects of the one or more acoustic liners 100 may be configured to cause sound waves to become out-of-phase because of such reflections or propagations. When sound waves become out-of-phase, various portions of the sound waves tend to cancel one another, thereby reducing at least some of the energy in the sound waves.

Figure 2:
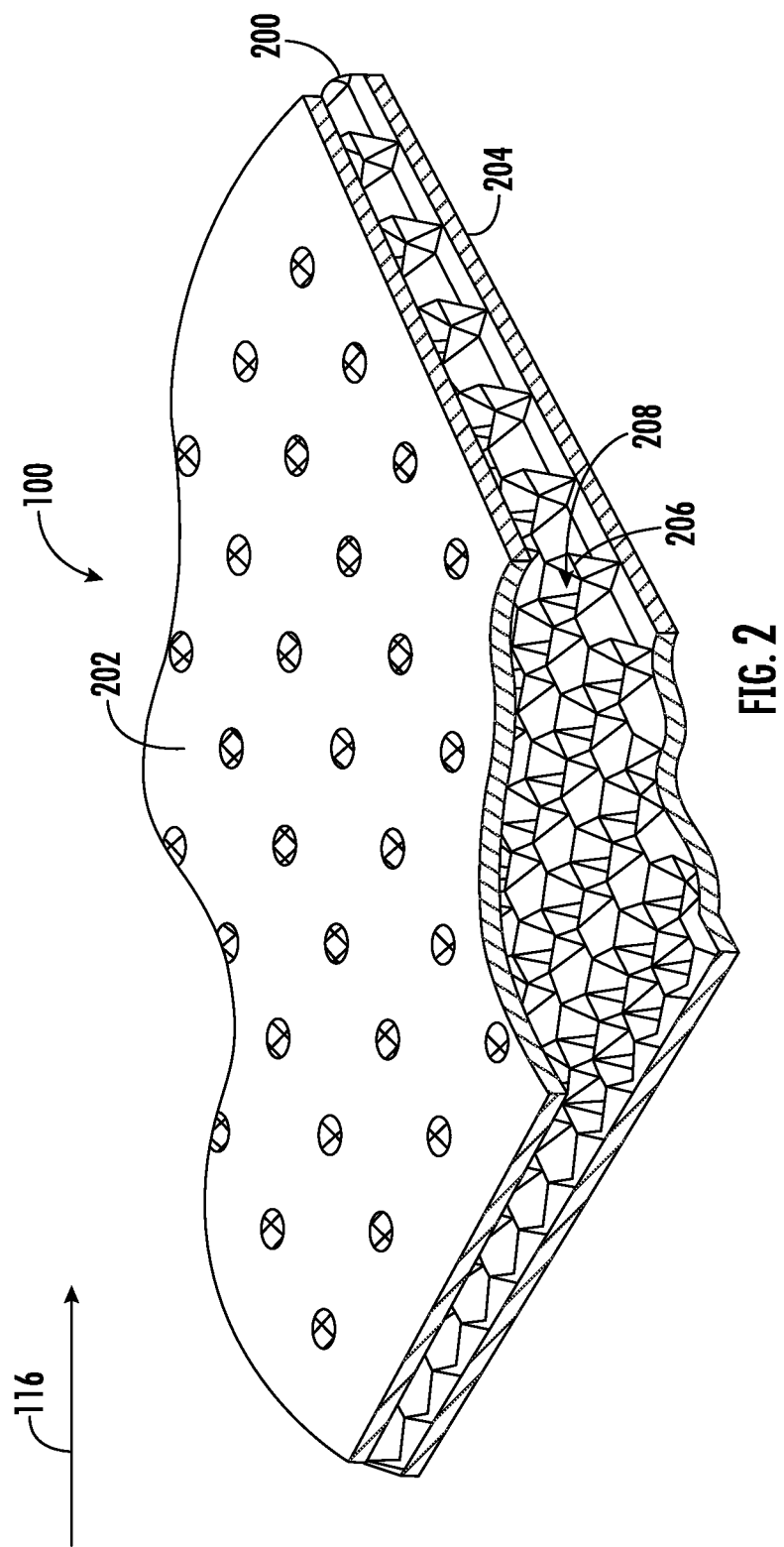
FIG. 2 schematically depicts an isometric partial cutaway view of a portion of an exemplary acoustic liner in accordance with an exemplary embodiment of the present disclosure.

FIG. 2 shows an isometric partial cutaway view of a portion of an exemplary acoustic liner 100. The acoustic liner 100 shown in FIG. 2 may be configured for use with the turbomachine 102 shown in FIG. 1A or for attenuating noise from any other source within the contemplation of those skilled in the art. In some embodiments, the acoustic liner 100 may be disposed proximate to airflow 116 (also shown in FIGS. 1A-1B). The acoustic liner 100 may be secured within the turbomachine 102 by a flange or other attachment with the duct wall 114 and/or the fan casing portion 122 (FIG. 1A). The acoustic liner 100 includes an acoustic core 200 positioned between an acoustic screen 202 and a substantially imperforate back sheet 204. The acoustic screen 202 may include a perforated plate, a mesh (e.g., formed of wire, cloth, fibers, and/or filaments), or a combination thereof. Additionally, or in the alternative, the acoustic screen 202 may include an additively manufactured component. In some embodiments, the acoustic screen 202 and the back sheet 204 form planes having a generally parallel orientation relative to one another. The acoustic core 200 is made up of hollow cellular structures or resonant cells 206 disposed between the acoustic screen 202 and the back sheet 204. The resonant cells 206 include a plurality of cell walls that define a hollow resonant space 208.

In exemplary embodiments, the acoustic core 200, the acoustic screen 202, and/or the back sheet 204 may be formed using an additive manufacturing technology, which may allow for acoustic liners 100 with novel configuration, geometries, and/or features that provide certain improvements and/or avoid certain shortcomings as compared with previous acoustic liners. Such additive manufacturing technology may be utilized, alone or together with other manufacturing technologies, to provide acoustic liners 100 in accordance with the present disclosure.

For example, an acoustic liner 100 may be formed in whole or in part using an additive manufacturing technology. Sequential layers of the acoustic core 200, the acoustic screen 202, and/or the back sheet 204 may be additively manufactured using a suitable additive manufacturing technology.

The acoustic core 200, the acoustic screen 202, the back sheet 204 may be formed as part of an additive manufacturing technology or any other suitable process, separately or concurrently with one another. The acoustic screen 202 and/or the back sheet 204 may additionally or alternatively be formed as part of an any other manufacturing technology separately or concurrently with the acoustic core 200. Additionally, or in the alternative, the acoustic screen 202 and/or the back sheet 204 may be combined with the acoustic core 200, for example, using a bonding process such as a thermal, sonic, or electric welding process.

Furthermore, systems and methods of the present disclosure for more effectively bonding the acoustic screen 202 to a facesheet of an acoustic liner 100 will now be described with references to FIGS. 3A-5.

Referring now to FIGS. 3A-4E, exemplary embodiments and methods for bonding an acoustic screen 306, 406 to a facesheet 308, 408 of an acoustic liner 100 (FIGS. 1A and 2) using a solid adhesive film 300, 400 are illustrated.

As discussed above, advanced acoustic liners in general require low resistance facesheets, having a high percentage of open area, wherein an acoustic screen is bonded to the facesheet.

As described above, conventional methods of attaching these components include liquid film and spray adhesives. However, these adhesives can liquify and wick into the acoustic screen when heated for cure thereby becoming a debris that blocks the plurality of apertures formed in the acoustic screen and facesheet, impacting airflow through the apertures. Further, liquid spray adhesives provide lower levels of adhesion between the acoustic screen and the facesheet. These challenges of conventional methods with aperture blockage caused by adhesive liquid flow are solved with the systems and methods of the present disclosure using a solid adhesive film. Furthermore, systems and methods of the present disclosure ensure alignment of the solid adhesive film and the facesheet, e.g., alignment of perforations of the components, during the bonding process. The solid adhesive film of the present disclosure allows for bonding of an acoustic screen to a perforated facesheet in an acoustic liner.

Referring to FIGS. 3A-3H, in an exemplary embodiment of the present disclosure, a method for bonding an acoustic screen 306 (FIG. 3G) to a facesheet 308 of an acoustic liner 100 (FIGS. 1A and 2) using a solid adhesive film 300 having a first adhesive side 302 and a second adhesive side 304 will now be discussed.

It is contemplated that the solid adhesive film 300 utilized with the present disclosure does not allow a liquid flow therethrough and exhibits no liquid flow. As used herein, the term "solid adhesive film" may refer to an adhesive that does not include any liquid adhesives and does not allow any liquid to flow through the solid adhesive film and/or other components. In this manner, a solid adhesive film of the present disclosure does not allow wicking into other components, e.g., acoustic screen 306 and/or facesheet 308, during the bonding process and will not cause inadvertent blockage of any perforations of the acoustic screen 306 and/or the facesheet 308. In other words, a solid adhesive film of the present disclosure prevents blockage of perforations of the components during the bonding process leading to a more robust, consistent facesheet 308 resistance in the acoustic liner 100.

It is contemplated that the solid adhesive film 300 of the present disclosure has temperature capabilities up to 300 degrees Fahrenheit. In other exemplary embodiments, it is contemplated that the solid adhesive film 300 of the present disclosure has other temperature capabilities, e.g., up to 350 degrees Fahrenheit and/or up to 400 degrees Fahrenheit. Furthermore, the solid adhesive film 300 of the present disclosure has an improved peel strength and an improved toughness, e.g., the ability of the solid adhesive film 300 to absorb energy and plastically deform without fracturing. In this manner, the solid adhesive film 300 adds impact resistance to the other components, e.g., the facesheet 308, to reduce impact damage of the components.

It is contemplated that the solid adhesive film 300 of the present disclosure includes a double-sided adhesive, e.g., pressure sensitive adhesive on both sides. Furthermore, the solid adhesive film 300 is a compliant and/or elastomeric adhesive, such as an elastomeric tape. For example, in exemplary embodiments, it is contemplated that the solid adhesive film 300 includes a foam or rubber with pressure sensitive adhesive on both sides. It is also contemplated that the solid adhesive film 300 does not allow a liquid flow therethrough, as described above.

The solid adhesive film 300 and/or the facesheet 308 may be provided in a variety of different embodiments prior to bonding. For example, they may already contain a plurality of perforations (to align with perforations on the acoustic screen 306), may initially be substantially free of any perforations, or a combination thereof. Depending on the state of the initial solid adhesive film 300 and/or the facesheet 308, various potential steps may be included such as, for example, perforating one or more of the solid adhesive film 300 and the facesheet 308, or aligning the solid adhesive film 300 and the facesheet 308 using existing perforations. While various examples of various optional steps are presented herein with respect to various potential embodiments (e.g., with or without pre-existing perforations), it should be appreciated that these are non-limiting examples and alternative embodiments may further be realized within the scope of this disclosure.

The bonding of the acoustic screen 306 to the facesheet 308 using the systems and methods of the present disclosure including a solid adhesive film 300 also allows for more consistent fabrication of an acoustic liner 100 to eliminate hole blockage and retain acoustic benefits. The systems and methods of the present disclosure also reduce cycle time for manufacturing.

Figure 3A:
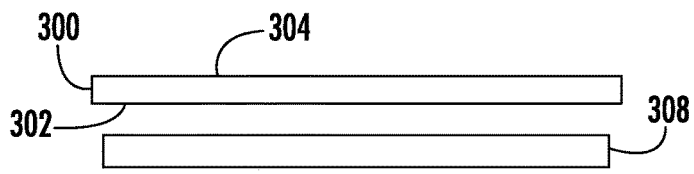
FIG. 3A is a schematic view of a step of a method for bonding an acoustic screen to a facesheet of an acoustic liner using a solid adhesive film in accordance with an exemplary embodiment of the present disclosure.
Figure 3B:
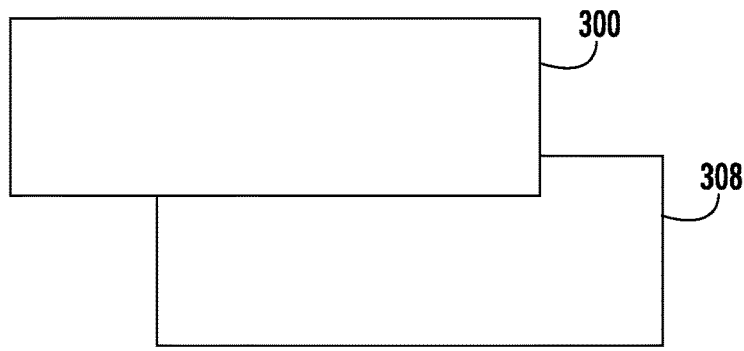
FIG. 3B is a schematic view of a step of a method for bonding an acoustic screen to a facesheet of an acoustic liner using a solid adhesive film in accordance with an exemplary embodiment of the present disclosure.
Figure 3C:
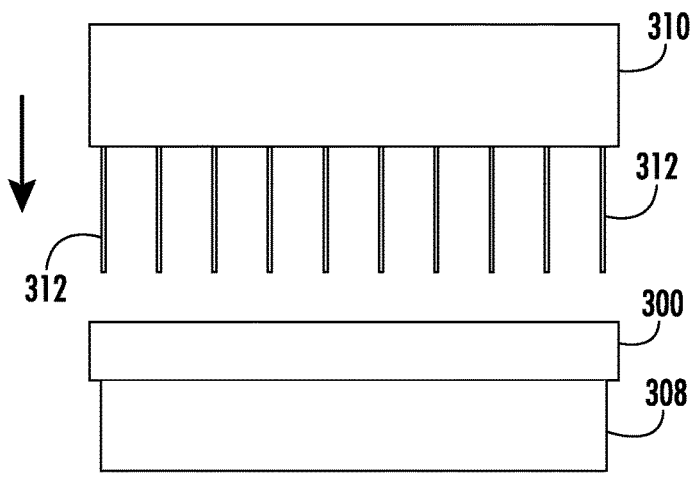
FIG. 3C is a schematic view of a step of a method for bonding an acoustic screen to a facesheet of an acoustic liner using a solid adhesive film in accordance with an exemplary embodiment of the present disclosure.

Referring to FIGS. 3A-3C, the acoustic liner 100 (FIGS. 1A and 2) includes the solid adhesive film 300 including the first adhesive side 302 and the second adhesive side 304. In the illustrated embodiment, the solid adhesive film 300 includes no perforations and the facesheet 308 has no perforations, with the facesheet 308 being bonded to the first adhesive side 302 or the second adhesive side 304 of the solid adhesive film 300.

Referring to FIGS. 3A and 3B, in a first step, the method includes bonding the facesheet 308 to the first adhesive side 302 of the solid adhesive film 300. Importantly, as illustrated in FIG. 3B, in this step, both the solid adhesive film 300 and the facesheet 308 have no perforations.

Next, referring to FIG. 3C, the method includes machining perforations through the facesheet 308 and the solid adhesive film 300. In exemplary embodiments, a machining tool 310 having one or more cutting elements 312 is used in a single machining step to simultaneously machine perforations through the facesheet 308 and the solid adhesive film 300. It is contemplated that the machining tool 310 may include laser cutting, die punching, lathe machines, sandblasting, drilling machines, blasting, or any other cutting machining process. The controlled machining perforations through the facesheet 308 and the solid adhesive film 300 of the present disclosure toughens the facesheet 308 and improves the mechanics of the facesheet 308.

Referring still to FIG. 3C, in one exemplary embodiment, the step of machining perforations through the facesheet 308 and the solid adhesive film 300 includes the perforations being made through the solid adhesive film 300 and then the facesheet 308. For example, the one or more cutting elements 312 are positioned adjacent and initially perforate the solid adhesive film 300 before perforating the facesheet 308.

Figure 3D:
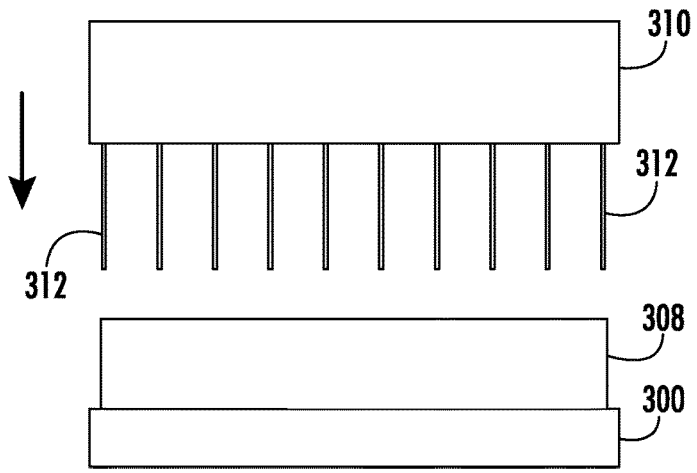
FIG. 3D is a schematic view of a step of a method for bonding an acoustic screen to a facesheet of an acoustic liner using a solid adhesive film in accordance with an exemplary embodiment of the present disclosure.

Referring to FIG. 3D, in another exemplary embodiment, the step of machining perforations through the facesheet 308 and the solid adhesive film 300 includes the perforations being made through the facesheet 308 and then the solid adhesive film 300. For example, the one or more cutting elements 312 are positioned adjacent and initially perforate the facesheet 308 before perforating the solid adhesive film 300.

Figure 3E:
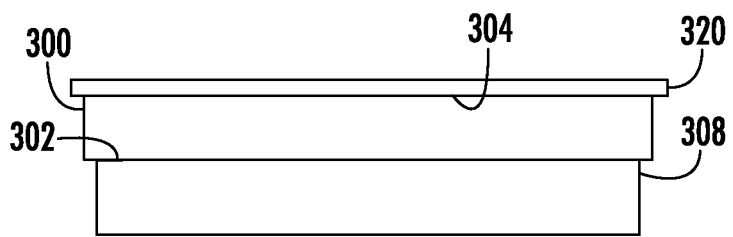
FIG. 3E is a schematic view of a step of a method for bonding an acoustic screen to a facesheet of an acoustic liner using a solid adhesive film in accordance with an exemplary embodiment of the present disclosure.
Figure 3F:
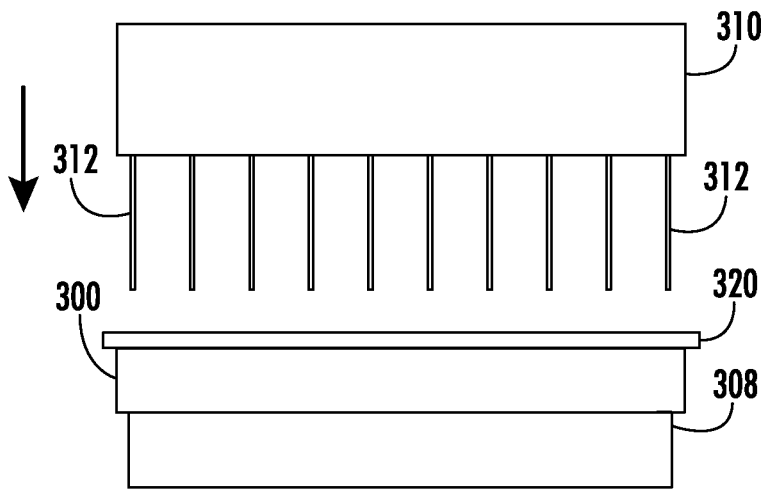
FIG. 3F is a schematic view of a step of a method for bonding an acoustic screen to a facesheet of an acoustic liner using a solid adhesive film in accordance with an exemplary embodiment of the present disclosure.

Referring to FIGS. 3E and 3F, in some exemplary embodiments, the method for bonding the acoustic screen 306 to the facesheet 308 of the acoustic liner 100 (FIGS. 1A and 2) using the solid adhesive film 300 having the first adhesive side 302 and the second adhesive side 304 may also include removing a backing material 320 from the first adhesive side 302 and the second adhesive side 304 of the solid adhesive film 300 before the bonding step. It is also contemplated that the backing material 320 provides further support to the solid adhesive film 300 to support and strengthen the solid adhesive film 300 during the bonding and machining steps. It is contemplated that the backing material 320 may comprise a stiff supporting material such as a wet layup composite material or other stiff supporting materials. Referring to FIG. 3F, in one exemplary embodiment, with the backing material 320 on the solid adhesive film 300, the machining tool 310 having the one or more cutting elements 312 is used to machine perforations through the facesheet 308, the solid adhesive film 300, and the backing material 320. In another exemplary embodiment, with the backing material 320 removed from the solid adhesive film 300, the machining tool 310 having the one or more cutting elements 312 is used to machine perforations through the facesheet 308 and the solid adhesive film 300.

Figure 5:
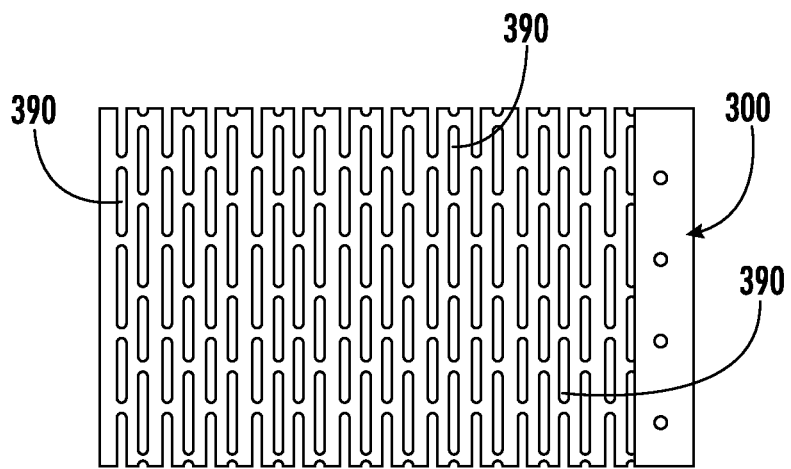
FIG. 5 depicts a top view of a solid adhesive film having perforations in accordance with an exemplary embodiment of the present disclosure.

Referring to FIG. 5, after the step of machining perforations through the facesheet 308 and the solid adhesive film 300, the facesheet 308 and the solid adhesive film 300 will have a proper configuration of perforations 390 therethrough.

Figure 3G:
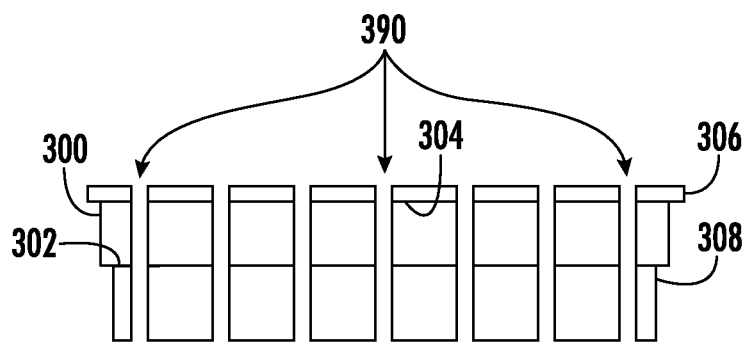
FIG. 3G is a schematic view of a step of a method for bonding an acoustic screen to a facesheet of an acoustic liner using a solid adhesive film in accordance with an exemplary embodiment of the present disclosure.

Referring to FIG. 3G, next, after the machining perforations through the facesheet 308 and the solid adhesive film 300 step, the method includes bonding the acoustic screen 306 to the second adhesive side 304 of the solid adhesive film 300. It is contemplated that in other embodiments, the acoustic screen 306 may be bonded to the solid adhesive film 300 at other times, e.g., before the step of machining perforations through the facesheet 308 and the solid adhesive film 300.

In exemplary embodiments including a solid adhesive film 300 having the backing material 320 on the first adhesive side 302 and/or the second adhesive side 304 (FIGS. 3E and 3F), the backing material 320 is removed before bonding the acoustic screen 306 to the second adhesive side 304 of the adhesive 300.

Figure 3H:
FIG. 3H is a schematic view of a step of a method for bonding an acoustic screen to a facesheet of an acoustic liner using a solid adhesive film in accordance with an exemplary embodiment of the present disclosure.

Referring to FIG. 3H, in an exemplary embodiment, the solid adhesive film 300 includes a first protective release film or paper 322 on the first adhesive side 302 of the solid adhesive film 300 and a second protective release film or paper 324 on the second adhesive side 304 of the solid adhesive film 300.

Referring to FIGS. 4A-4E, in another exemplary embodiment of the present disclosure, a method for bonding an acoustic screen 406 (FIG. 4D) to a facesheet 408 of an acoustic liner 100 (FIGS. 1A and 2) using a solid adhesive film 400 having a first adhesive side 402 and a second adhesive side 404 will now be discussed.

As described above with reference to solid adhesive film 300, it is contemplated that the solid adhesive film 400 utilized with the present disclosure does not allow a liquid flow therethrough and exhibits no liquid flow. As used herein, the term "solid adhesive film" may refer to an adhesive that does not include any liquid adhesives and does not allow any liquid to flow through the solid adhesive film and/or other components. In this manner, a solid adhesive film of the present disclosure does not allow wicking into other components, e.g., acoustic screen 406 and/or facesheet 408, during the bonding process and will not cause inadvertent blockage of any perforations of the acoustic screen 406 and/or the facesheet 408. In other words, a solid adhesive film of the present disclosure prevents blockage of perforations of the components during the bonding process leading to a more robust, consistent facesheet resistance in an acoustic liner 100.

Figure 4A:
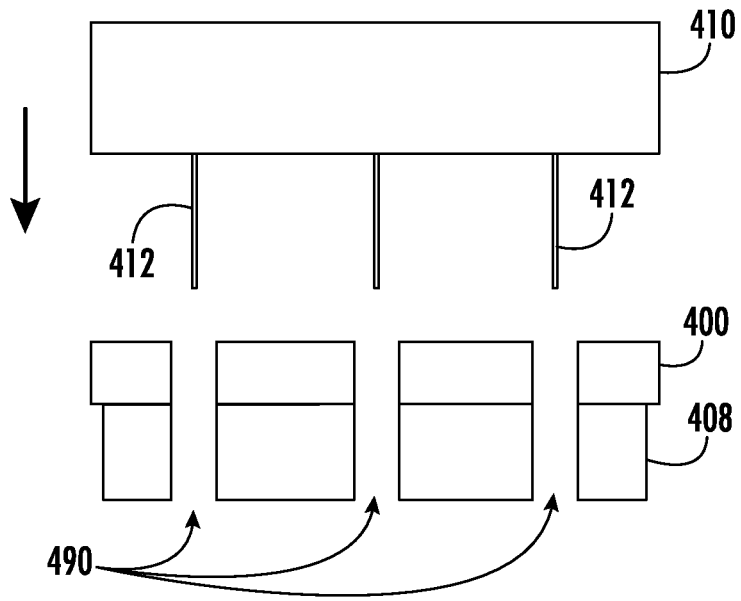
FIG. 4A is a schematic view of a step of a method for bonding an acoustic screen to a facesheet of an acoustic liner using a solid adhesive film in accordance with another exemplary embodiment of the present disclosure.

Referring to FIG. 4A, in a first step, the method includes perforating the solid adhesive film 400 and perforating the facesheet 408. In this manner, the solid adhesive film 400 and the facesheet 408 include one or more perforations 490.

In exemplary embodiments, a machining tool 410 having one or more cutting elements 412 is used in a single machining step to machine perforations through the solid adhesive film 400 and the facesheet 408. In an exemplary embodiment, the machining tool 410 comprises a laser cutting machine. It is contemplated that the machining tool 410 may include die punching, lathe machines, sandblasting, drilling machines, blasting, or any other cutting machining process. The controlled machining of perforations through the facesheet 408 and the solid adhesive film 400 of the present disclosure toughens the facesheet 408 and improves the mechanics of the facesheet 408.

It is contemplated that in some exemplary embodiments, the machining tool 410 or other process may perforate the solid adhesive film 400 and the facesheet 408 simultaneously. However, it is also contemplated that in other exemplary embodiments, the machining tool 410 or other process may perforate the solid adhesive film 400 and the facesheet 408 separately.

Figure 4B:
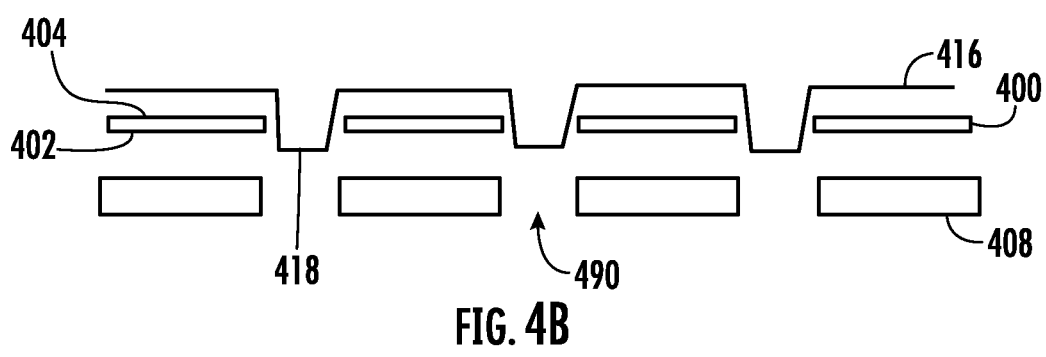
FIG. 4B is a schematic view of a step of a method for bonding an acoustic screen to a facesheet of an acoustic liner using a solid adhesive film in accordance with another exemplary embodiment of the present disclosure.

Next, referring to FIG. 4B, the method includes using an alignment tool 416 to align and bond the facesheet 408 to the first adhesive side 402 of the solid adhesive film 400. It is contemplated that the alignment tool 416 can be any tool that allows for aligning and bonding the facesheet 408 to the solid adhesive film 400.

Referring still to FIG. 4B, in one exemplary embodiment, the step of using the alignment tool 416 to align and bond the facesheet 408 to the first adhesive side 402 of the solid adhesive film 400 includes placing the solid adhesive film 400 in the alignment tool 416 and then pressing the alignment tool 416 with the solid adhesive film 400 onto the facesheet 408 to bond the facesheet 408 to the first adhesive side 402 of the solid adhesive film 400.

In an exemplary embodiment, the alignment tool 416 includes one or more protrusions 418 that can be positioned within the one or more cooperative perforations 490 of the solid adhesive film 400 to properly align the solid adhesive film 400 within the alignment tool 416.

Figure 4C:
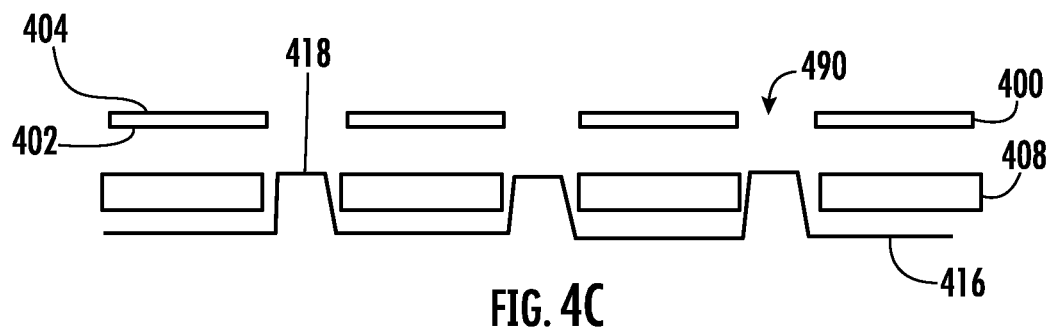
FIG. 4C is a schematic view of a step of a method for bonding an acoustic screen to a facesheet of an acoustic liner using a solid adhesive film in accordance with another exemplary embodiment of the present disclosure.

Referring to FIG. 4C, in another exemplary embodiment, the step of using the alignment tool 416 to align and bond the facesheet 408 to the first adhesive side 402 of the solid adhesive film 400 includes placing the facesheet 408 in the alignment tool 416 and then pressing the alignment tool 416 with the facesheet 408 onto the solid adhesive film 400 to bond the facesheet 408 to the first adhesive side 402 of the solid adhesive film 400.

In an exemplary embodiment, the alignment tool 416 includes protrusions 418 that can be positioned within perforations 490 of the facesheet 408 to properly align the facesheet 408 within the alignment tool 416.

Figure 4D:
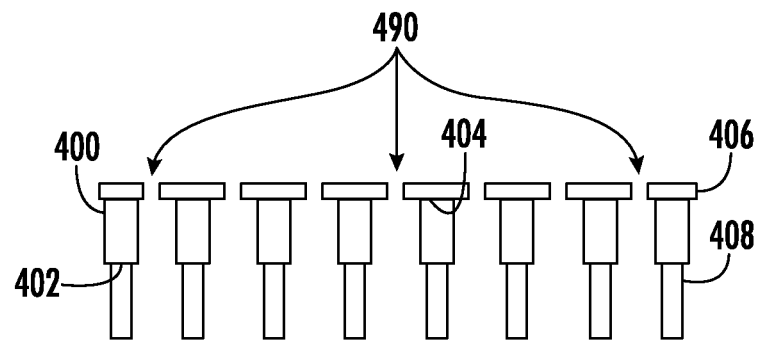
FIG. 4D is a schematic view of a step of a method for bonding an acoustic screen to a facesheet of an acoustic liner using a solid adhesive film in accordance with another exemplary embodiment of the present disclosure.

Referring to FIG. 4D, after the alignment tool 416 is used to align and bond the facesheet 408 to the first adhesive side 402 of the solid adhesive film 400, the method further includes bonding the acoustic screen 406 to the second adhesive side 404 of the solid adhesive film 400. It is contemplated that in other embodiments, the acoustic screen 406 may be bonded to the solid adhesive film 400 at other times, e.g., before the alignment tool 416 is used to align and bond the facesheet 408 to the first adhesive side 402 of the solid adhesive film 400.

Figure 4E:
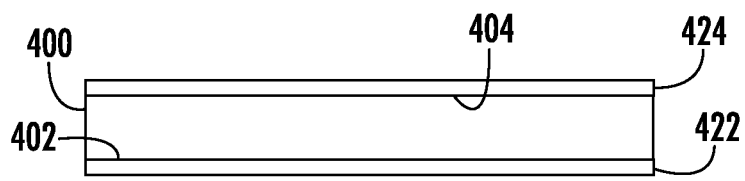
FIG. 4E is a schematic view of a step of a method for bonding an acoustic screen to a facesheet of an acoustic liner using a solid adhesive film in accordance with another exemplary embodiment of the present disclosure.

Referring to FIG. 4E, in an exemplary embodiment, the solid adhesive film 400 includes a first protective release film or paper 422 on the first adhesive side 402 of the solid adhesive film 400 and a second protective release film or paper 424 on the second adhesive side 404 of the solid adhesive film 400. In such exemplary embodiments, the first protective release film 422 and the second protective release film 424 are removed before bonding the solid adhesive film 400 and the facesheet 408.

Referring now to FIGS. 6A-7B, exemplary process steps of methods for bonding an acoustic screen to a facesheet of an acoustic liner 100 (FIGS. 1A and 2) using a solid adhesive film will now be discussed. These methods also correspond to systems and methods described in detail above with reference to FIGS. 3A-3H.

Figure 6A:
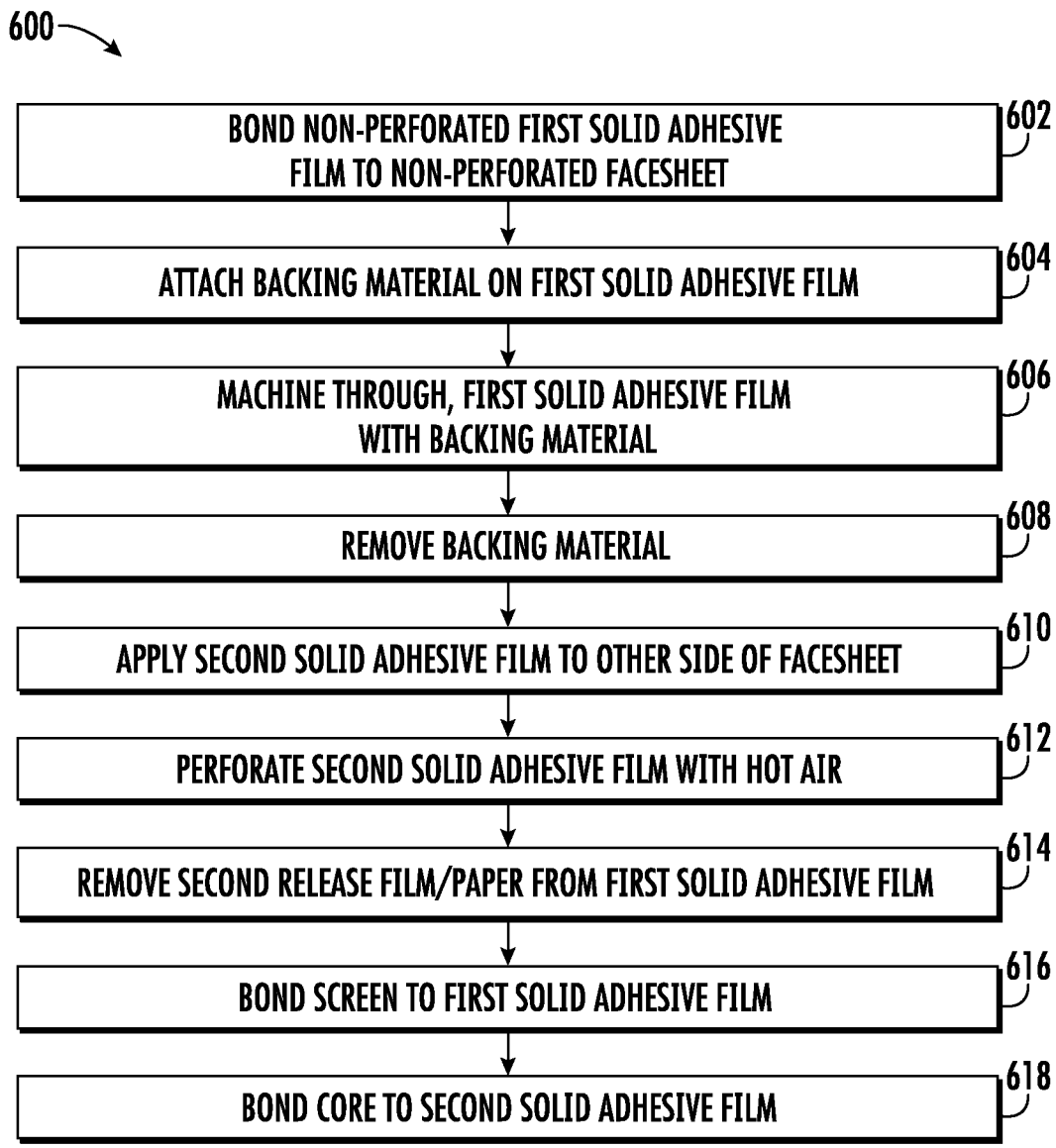
FIG. 6A is a flow diagram of a method for bonding an acoustic screen to a facesheet of an acoustic liner using a solid adhesive film in accordance with an exemplary aspect of the present disclosure.

For the exemplary aspect of FIG. 6A, a method 600 generally includes at (602) bonding a non-perforated first solid adhesive film to a non-perforated facesheet; at (604) attaching backing material on the first solid adhesive film; at (606) machining through the facesheet and the first solid adhesive film with backing material; at (608) removing the backing material; at (610) applying second solid adhesive film to the other side of the facesheet; at (612) perforating the second solid adhesive film with hot air; at (614) removing a second release film/paper from the first solid adhesive film; at (616) bonding an acoustic screen to the first solid adhesive film; and at (618) bonding an acoustic core to the second solid adhesive film.

Figure 6B:
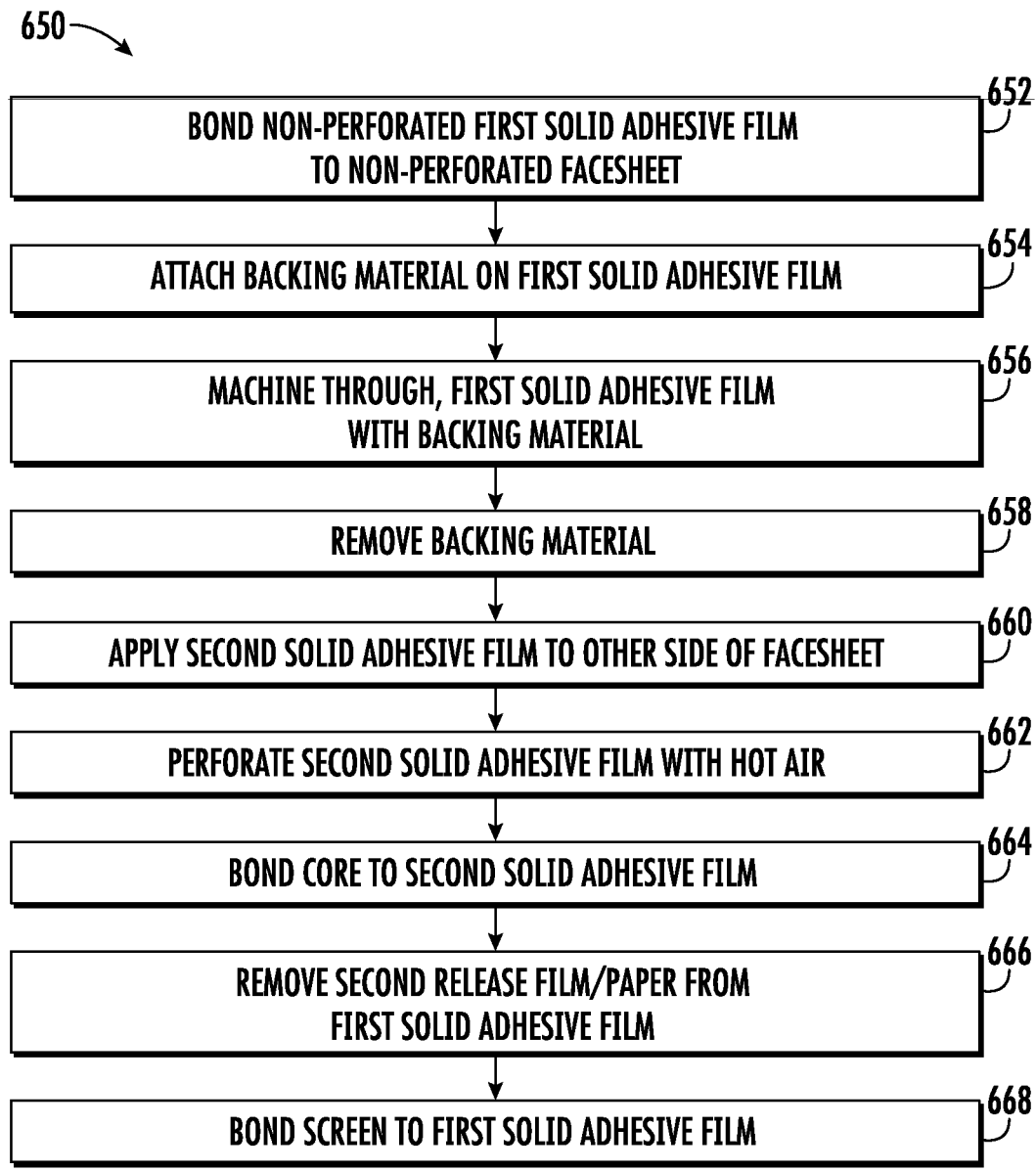
FIG. 6B is a flow diagram of a method for bonding an acoustic screen to a facesheet of an acoustic liner using a solid adhesive film in accordance with another exemplary aspect of the present disclosure.

For the exemplary aspect of FIG. 6B, a method 650 generally includes at (652) bonding a non-perforated first solid adhesive film to a non-perforated facesheet; at (654) attaching backing material on the first solid adhesive film; at (656) machining through the facesheet and the first solid adhesive film with backing material; at (658) removing the backing material; at (660) applying second solid adhesive film to the other side of the facesheet; at (662) perforating the second solid adhesive film with hot air; at (664) bonding an acoustic core to the second solid adhesive film; at (666) removing a second release film/paper from the first solid adhesive film; and at (668) bonding an acoustic screen to the first solid adhesive film.

Figure 7A:
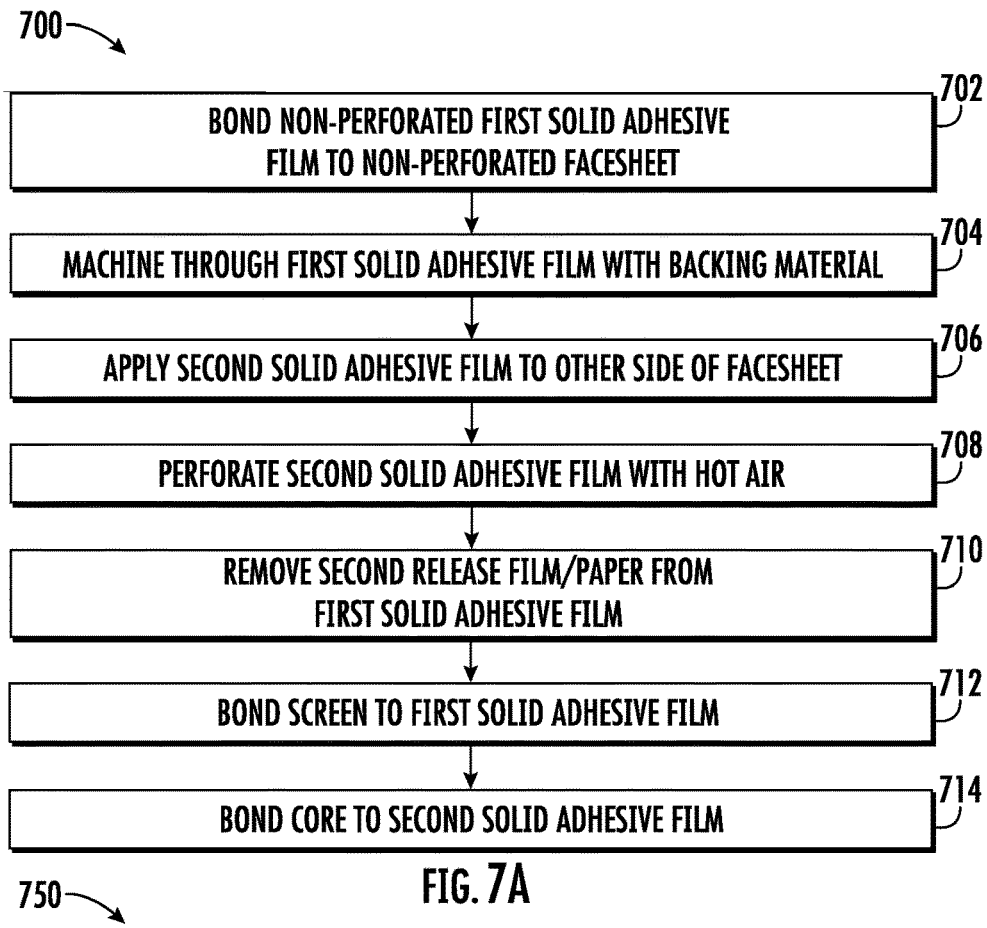
FIG. 7A is a flow diagram of a method for bonding an acoustic screen to a facesheet of an acoustic liner using a solid adhesive film in accordance with another exemplary aspect of the present disclosure.

For the exemplary aspect of FIG. 7A, a method 700 generally includes at (702) bonding a non-perforated first solid adhesive film to a non-perforated facesheet; at (704) machining through the first solid adhesive film with backing material and the facesheet; at (706) applying second solid adhesive film to the other side of the facesheet; at (708) perforating the second solid adhesive film with hot air; at (710) removing a second release film/paper from the first solid adhesive film; at (712) bonding an acoustic screen to the first solid adhesive film; and at (714) bonding an acoustic core to the second solid adhesive film.

Figure 7B:
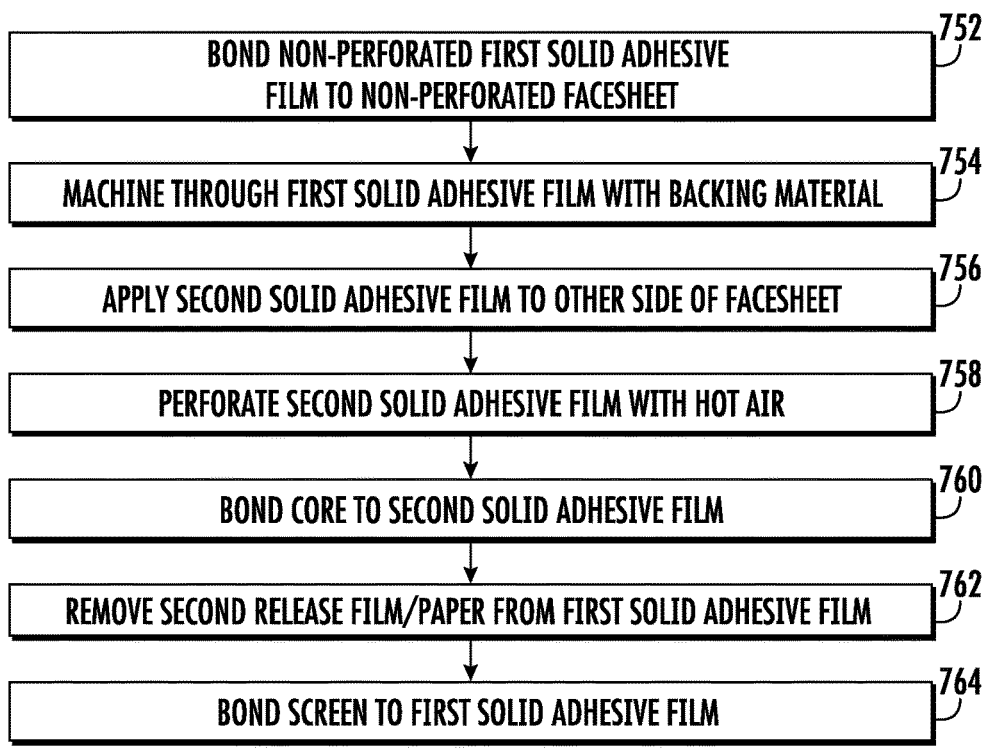
FIG. 7B is a flow diagram of a method for bonding an acoustic screen to a facesheet of an acoustic liner using a solid adhesive film in accordance with another exemplary aspect of the present disclosure.

For the exemplary aspect of FIG. 7B, a method 750 generally includes at (752) bonding a non-perforated first solid adhesive film to a non-perforated facesheet; at (754) machining through the first solid adhesive film with backing material and the facesheet; at (756) applying second solid adhesive film to the other side of the facesheet; at (758) perforating the second solid adhesive film with hot air; at (760) bonding an acoustic core to the second solid adhesive film; at (762) removing a second release film/paper from the first solid adhesive film; and at (764) bonding an acoustic screen to the first solid adhesive film.

Referring now to FIGS. 8A-9B, exemplary process steps of methods for bonding an acoustic screen to a facesheet of an acoustic liner 100 (FIGS. 1A and 2) using a solid adhesive film will now be discussed. These methods also correspond to systems and methods described in detail above with reference to FIGS. 4A-4E.

Figure 8A:
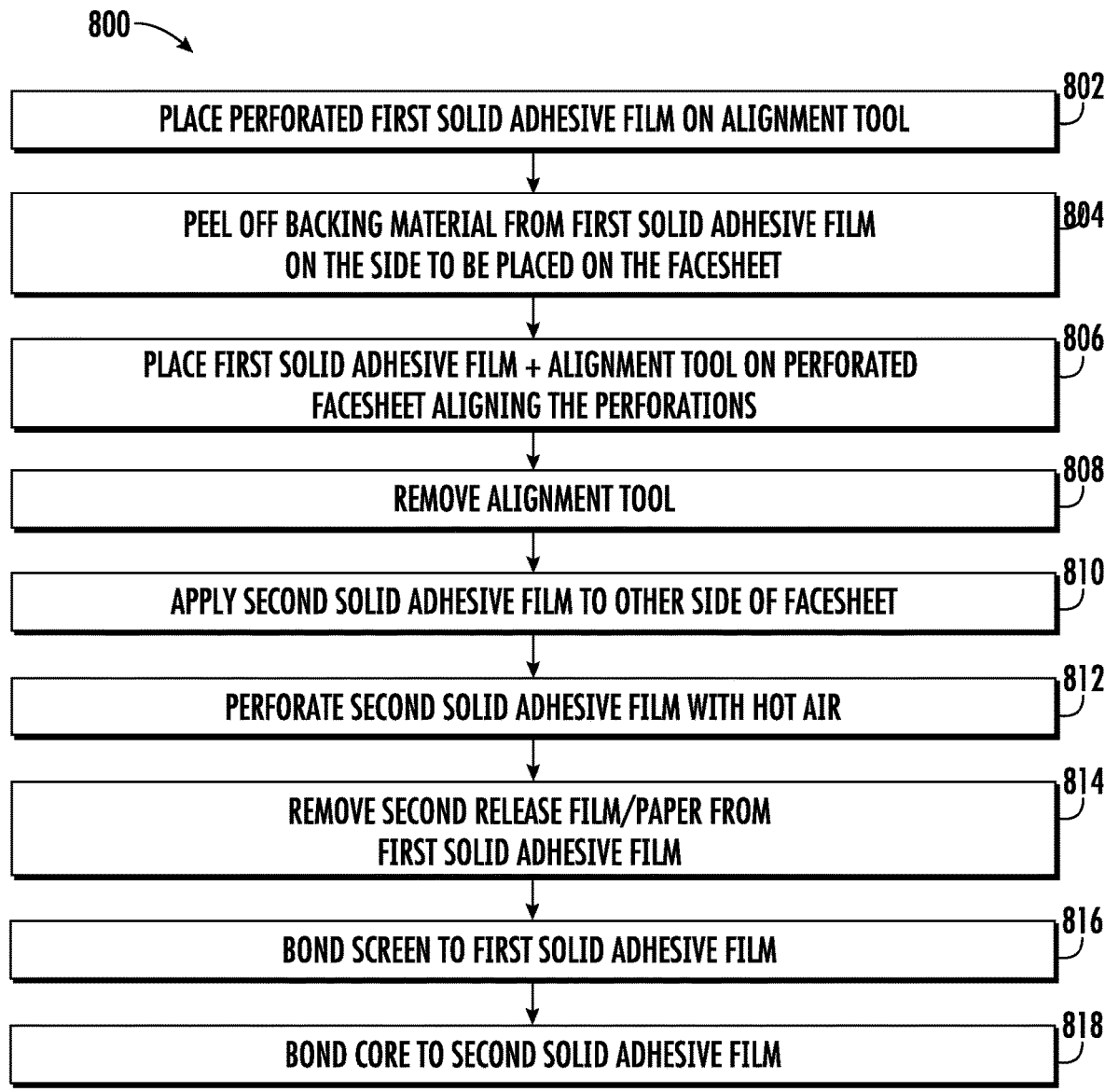
FIG. 8A is a flow diagram of a method for bonding an acoustic screen to a facesheet of an acoustic liner using a solid adhesive film in accordance with another exemplary aspect of the present disclosure.

For the exemplary aspect of FIG. 8A, a method 800 generally includes at (802) placing a first solid adhesive film on an alignment tool; at (804) peeling off backing material from the first solid adhesive film on the side to be bonded to a perforated facesheet; at (806) placing the first solid adhesive film and the alignment tool on the perforated facesheet aligning the perforations; at (808) removing the alignment tool; at (810) applying second solid adhesive film to the other side of the facesheet; at (812) perforating the second solid adhesive film with hot air; at (814) removing a second release film/paper from the first solid adhesive film; at (816) bonding an acoustic screen to the first solid adhesive film; and at (818) bonding an acoustic core to the second solid adhesive film.

Figure 8B:
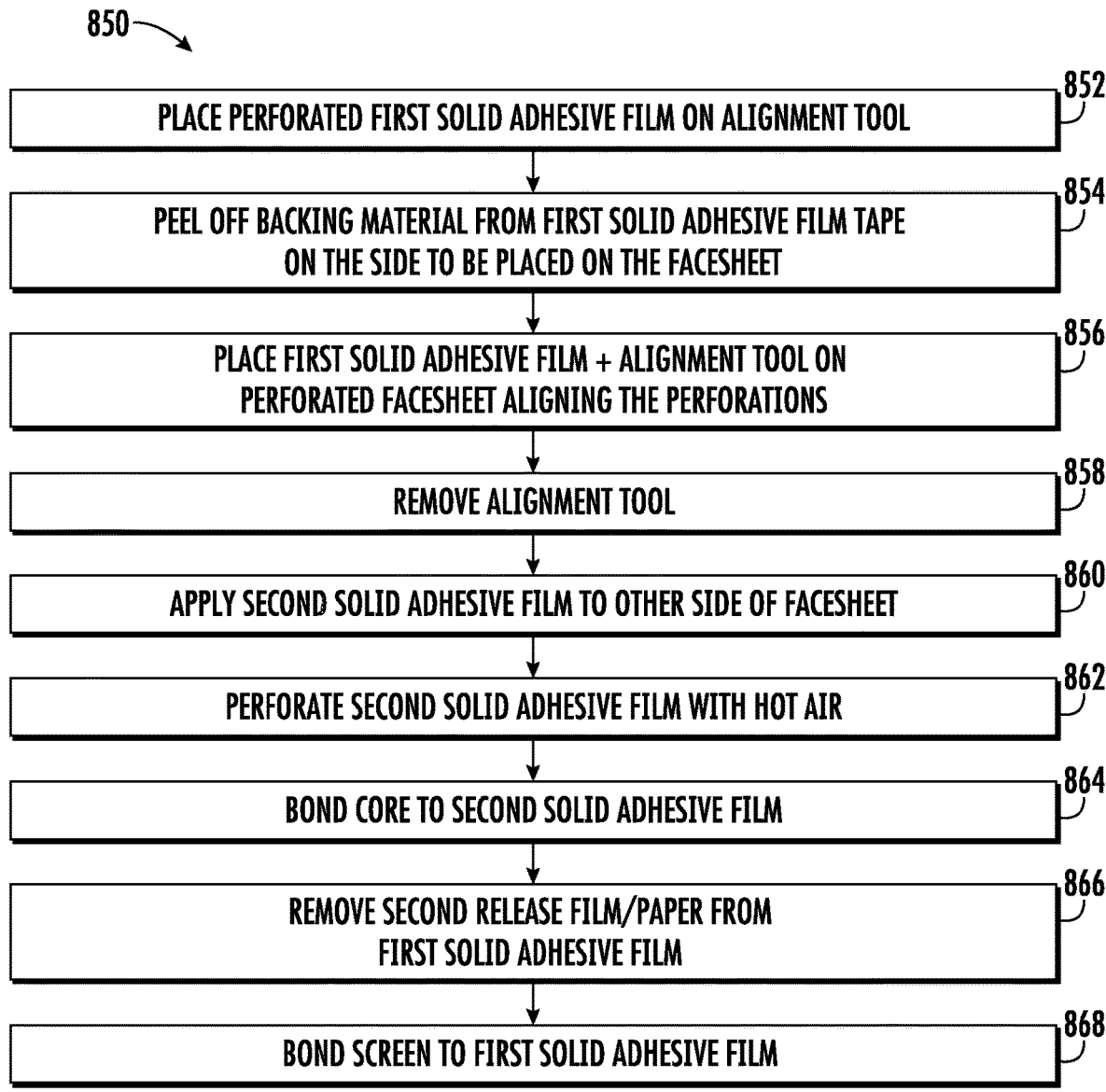
FIG. 8B is a flow diagram of a method for bonding an acoustic screen to a facesheet of an acoustic liner using a solid adhesive film in accordance with another exemplary aspect of the present disclosure.

For the exemplary aspect of FIG. 8B, a method 850 generally includes at (852) placing the first solid adhesive film on an alignment tool; at (854) peeling off backing material from the first solid adhesive film on the side to be bonded to a perforated facesheet; at (856) placing the first solid adhesive film and the alignment tool on the perforated facesheet aligning the perforations; at (858) removing the alignment tool; at (860) applying second solid adhesive film to the other side of the facesheet; at (862) perforating the second solid adhesive film with hot air; at (864) bonding an acoustic core to the second solid adhesive film; at (866) removing a second release film/paper from the first solid adhesive film; and at (868) bonding an acoustic screen to the first solid adhesive film.

Figure 9A:
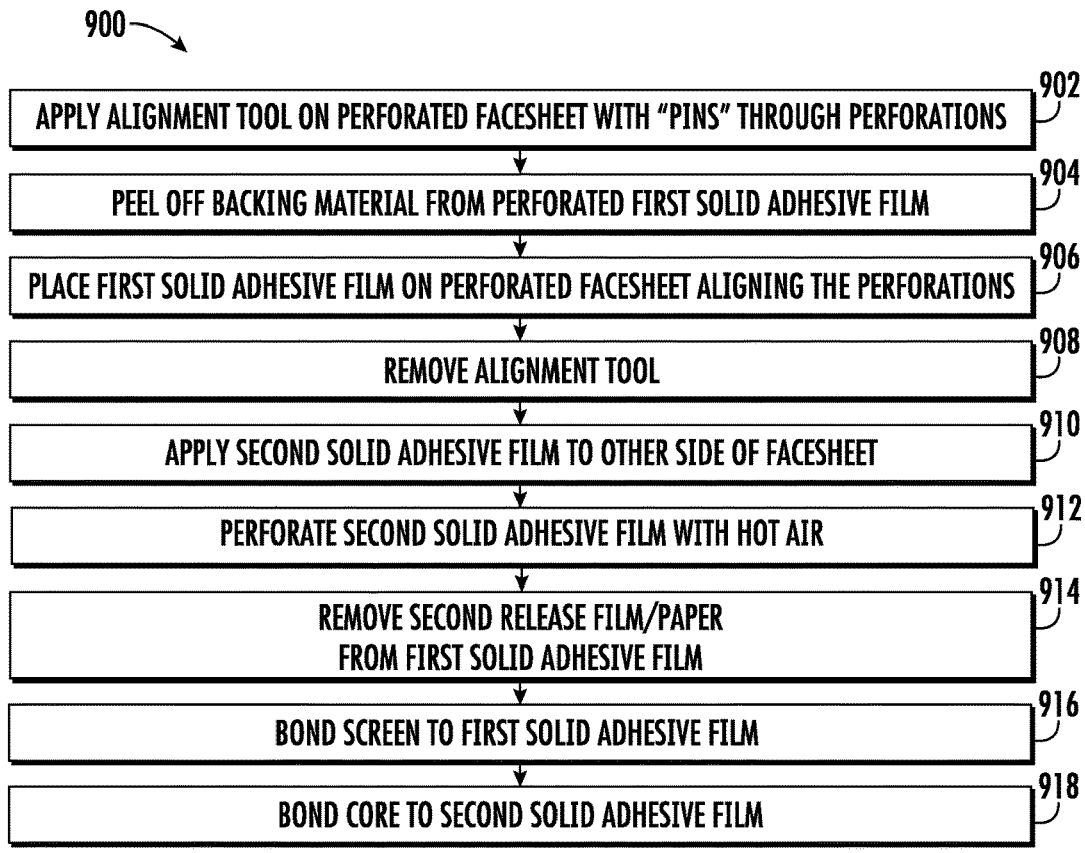
FIG. 9A is a flow diagram of a method for bonding an acoustic screen to a facesheet of an acoustic liner using a solid adhesive film in accordance with another exemplary aspect of the present disclosure.

For the exemplary aspect of FIG. 9A, a method 900 generally includes at (902) applying the alignment tool on a perforated facesheet with pins or protrusions of the alignment tool through the perforations of the facesheet; at (904) peeling off backing material from the first solid adhesive film on the side to be bonded to the facesheet; at (906) placing the perforated facesheet and the alignment tool on the first solid adhesive film aligning the perforations; at (908) removing the alignment tool; at (910) applying second solid adhesive film to the other side of the facesheet; at (912) perforating the second solid adhesive film with hot air; at (914) removing a second release film/paper from the first solid adhesive film; at (916) bonding an acoustic screen to the first solid adhesive film; and at (918) bonding an acoustic core to the second solid adhesive film.

Figure 9B:
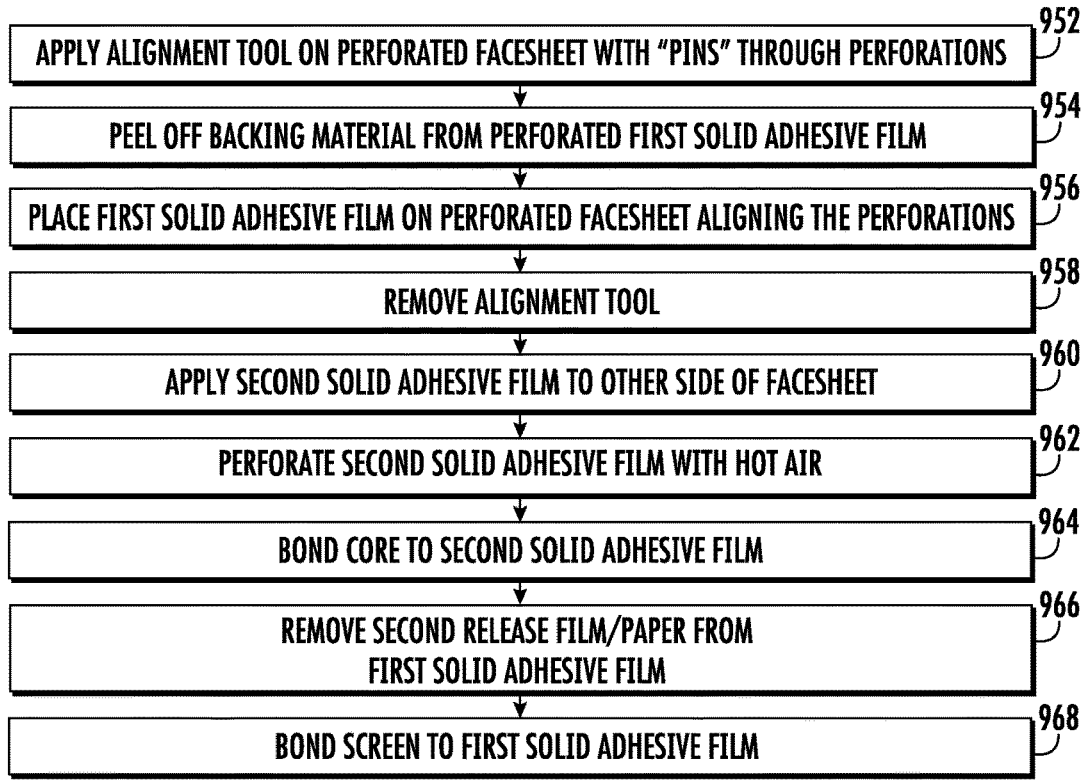
FIG. 9B is a flow diagram of a method for bonding an acoustic screen to a facesheet of an acoustic liner using a solid adhesive film in accordance with another exemplary aspect of the present disclosure.

For the exemplary aspect of FIG. 9B, a method 950 generally includes at (952) applying the alignment tool on a perforated facesheet with pins or protrusions of the alignment tool through the perforations of the facesheet; at (954) peeling off backing material from the first solid adhesive film on the side to be bonded to the facesheet; at (956) placing the perforated facesheet and the alignment tool on the first solid adhesive film aligning the perforations; at (958) removing the alignment tool; at (960) applying second solid adhesive film to the other side of the facesheet; at (962) perforating the second solid adhesive film with hot air; at (964) bonding an acoustic core to the second solid adhesive film; at (966) removing a second release film/paper from the first solid adhesive film; and at (968) bonding an acoustic screen to the first solid adhesive film.

Figure 10:
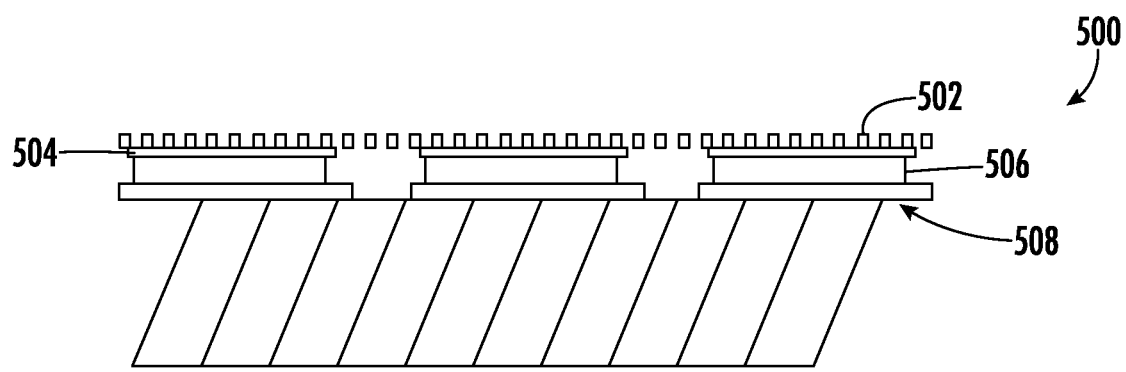
FIG. 10 is a schematic view of an acoustic liner in accordance with an exemplary embodiment of the present disclosure.

Referring now to FIG. 10, an exemplary embodiment of an acoustic liner system 500 of the present disclosure will now be described. Methods for bonding an acoustic screen to a facesheet of an acoustic liner 100 (FIGS. 1A and 2) using a solid adhesive film of the present disclosure, in a first configuration, can result in the orientation as shown in FIG. 10. For example, the system 500 includes a configuration from top to bottom including a perforated screen 502, a solid adhesive film 504, a facesheet 506, and an acoustic core 508.

Figure 11:
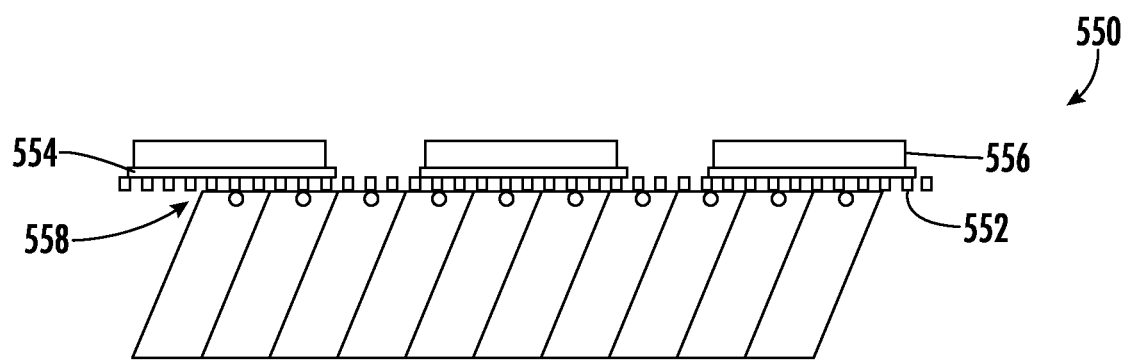
FIG. 11 is a schematic view of an acoustic liner in accordance with another exemplary embodiment of the present disclosure.

Referring now to FIG. 11, in another exemplary embodiment of an acoustic liner system 550 of the present disclosure will now be described. Methods for bonding an acoustic screen to a facesheet of an acoustic liner 100 (FIGS. 1A and 2) using a solid adhesive film of the present disclosure, in a second configuration, can result in the orientation as shown in FIG. 11. For example, the system 500 includes a configuration from top to bottom including a facesheet 556, a solid adhesive film 554, a perforated screen 552, and an acoustic core 558.

Figure 12:
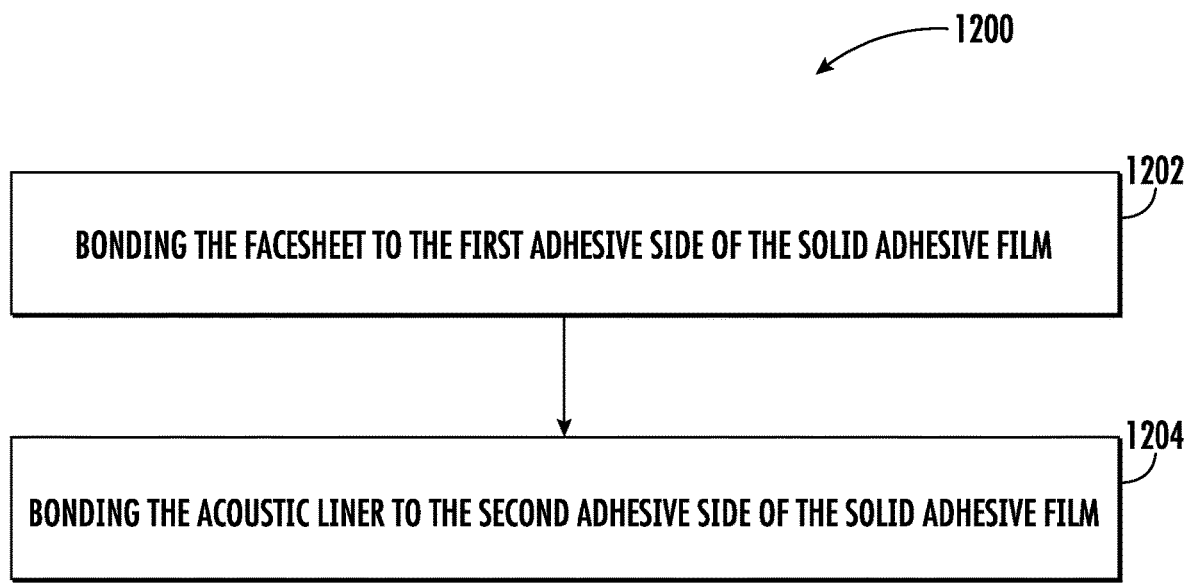
FIG. 12 is a flow diagram of a method for bonding a facesheet of an acoustic liner using a solid adhesive film having a first adhesive side opposite a second adhesive side in accordance with the present disclosure.

Referring now to FIG. 12, a method 1200 for bonding a facesheet of an acoustic liner using a solid adhesive film having a first adhesive side opposite a second adhesive side is provided. In certain exemplary aspects, the method 1200 may be utilized with one or more of the exemplary systems or methods described above.

The method 1200 includes at (1202) bonding the facesheet to the first adhesive side of the solid adhesive film as described in detail above.

The method 1200 further includes at (1204) bonding the acoustic liner to the second adhesive side of the solid adhesive film as described in detail above.

Further aspects of the disclosure are provided by the subject matter of the following clauses:

An acoustic liner, comprising: a solid adhesive film having a first adhesive side opposite a second adhesive side; an acoustic screen bonded to the first adhesive side of the solid adhesive film; and a facesheet bonded to the second adhesive side of the solid adhesive film.

The acoustic liner of any preceding clause, wherein the solid adhesive film comprises an elastomeric tape.

The acoustic liner of any preceding clause, wherein the first adhesive side and the second adhesive side of the solid adhesive film each comprise pressure sensitive adhesive.

The acoustic liner of any preceding clause, further comprising an acoustic core bonded to either the acoustic screen or the facesheet.

A method for bonding together a facesheet and an acoustic screen of an acoustic liner using a solid adhesive film having a first adhesive side opposite a second adhesive side, the method comprising: bonding the facesheet to the first adhesive side of the solid adhesive film; and bonding the acoustic screen to the second adhesive side of the solid adhesive film.

The method of any preceding clause, wherein the solid adhesive film comprises an elastomeric tape.

The method of any preceding clause, wherein the first adhesive side and the second adhesive side of the solid adhesive film each comprise pressure sensitive adhesive.

The method of any preceding clause, further comprising perforating the solid adhesive film and/or the facesheet.

The method of any preceding clause, wherein perforating the solid adhesive film and/or the facesheet occurs after the facesheet is bonded to the solid adhesive film.

The method of any preceding clause, wherein a plurality of perforations are simultaneously made through the facesheet and the solid adhesive film using a machining tool.

The method of any preceding clause, wherein the machining tool comprises laser cutting or die punching.

The method of any preceding clause, wherein a plurality of perforations are first made through the facesheet and then the solid adhesive film.

The method of any preceding clause, wherein a plurality of perforations are first made through the solid adhesive film and then the facesheet.

The method of any preceding clause, further comprising aligning the solid adhesive film and the facesheet with an alignment tool prior to bonding the facesheet to the first adhesive side of the solid adhesive film.

The method of any preceding clause, wherein the alignment tool comprises protrusions that can be simultaneously positioned within one or more perforations of the facesheet and within one or more perforations of the solid adhesive film.

The method of any preceding clause, wherein aligning the solid adhesive film and the facesheet with an alignment tool comprises placing the solid adhesive film in the alignment tool and then pressing the alignment tool with the solid adhesive film onto the facesheet to bond the facesheet to the first adhesive side of the solid adhesive film.

The method of any preceding clause, wherein aligning the solid adhesive film and the facesheet with an alignment tool comprises placing the facesheet in the alignment tool and then pressing the alignment tool with the facesheet onto the solid adhesive film to bond the facesheet to the first adhesive side of the solid adhesive film.

The method of any preceding clause, further comprising aligning the solid adhesive film and the acoustic screen with an alignment tool prior to bonding the acoustic screen to the second adhesive side of the solid adhesive film.

The method of any preceding clause, further comprising bonding an acoustic core to either the acoustic screen or the facesheet.

The method of any preceding clause, further comprising bonding a back sheet to the acoustic core.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An acoustic liner, comprising:
a solid adhesive film having a first adhesive side and a second adhesive side opposite the first adhesive side, the solid adhesive film including a plurality of perforations;
an acoustic screen bonded to the solid adhesive film along the first adhesive side, and wherein the acoustic screen is a plate, mesh, or combination thereof;
a facesheet bonded to the solid adhesive film along the second adhesive side; and
an acoustic core bonded to the facesheet, wherein the solid adhesive film and the facesheet are sandwiched between the acoustic screen and the acoustic core.

2. The acoustic liner of claim 1, wherein the solid adhesive film comprises an elastomeric tape.

3. The acoustic liner of claim 2, wherein the first adhesive side and the second adhesive side of the solid adhesive film each comprise pressure sensitive adhesive.

4. The acoustic liner of claim 1, further comprising: a second solid adhesive film, wherein the acoustic core is bonded to the facesheet with the second solid adhesive film.

5. A method of forming an acoustic liner, the method comprising:
bonding a facesheet to a first adhesive side of a solid adhesive film;
bonding an acoustic screen to a second side of the solid adhesive film wherein the acoustic screen is a plate, mesh, or combination thereof; and
bonding an acoustic core to the facesheet;
wherein the facesheet includes a facesheet perforation, the solid adhesive film includes a film perforation, and the acoustic screen includes a screen perforation and wherein the facesheet perforation, screen perforation, and film perforation are aligned.

6. The method of claim 5, wherein the solid adhesive film comprises an elastomeric tape.

7. The method of claim 6, wherein the first adhesive side and the second adhesive side of the solid adhesive film each comprise pressure sensitive adhesive.

8. The method of claim 5, further comprising:
perforating the solid adhesive film and/or the facesheet.

9. The method of claim 8, wherein perforating the solid adhesive film and/or the facesheet occurs after the facesheet is bonded to the solid adhesive film.

10. The method of claim 9, wherein a plurality of perforations are simultaneously made through the facesheet and the solid adhesive film using a machining tool.

11. The method of claim 10, wherein the machining tool comprises laser cutting or die punching.

12. The method of claim 9, wherein a plurality of perforations are first made through the facesheet and then the solid adhesive film.

13. The method of claim 9, wherein a plurality of perforations are first made through the solid adhesive film and then the facesheet.

14. The method of claim 5, further comprising:
aligning the solid adhesive film and the facesheet with an alignment tool prior to bonding the facesheet to the first adhesive side of the solid adhesive film.

15. The method of claim 14, wherein the alignment tool comprises protrusions that can be simultaneously positioned within one or more perforations of the facesheet and within one or more perforations of the solid adhesive film.

16. The method of claim 15, wherein aligning the solid adhesive film and the facesheet with an alignment tool comprises placing the solid adhesive film in the alignment tool and then pressing the alignment tool with the solid adhesive film onto the facesheet to bond the facesheet to the first adhesive side of the solid adhesive film.

17. The method of claim 15, wherein aligning the solid adhesive film and the facesheet with an alignment tool comprises placing the facesheet in the alignment tool and then pressing the alignment tool with the facesheet onto the solid adhesive film to bond the facesheet to the first adhesive side of the solid adhesive film.

18. The method of claim 14, further comprising:
aligning the solid adhesive film and the acoustic screen with an alignment tool prior to bonding the acoustic screen to the second adhesive side of the solid adhesive film.

19. The method of claim 5, further comprising:
bonding the acoustic core to the facesheet with a second solid adhesive film.

20. The method of claim 19, further comprising:
bonding a back sheet to the acoustic core.

* * * * *